United States Patent
Pant et al.

(10) Patent No.: US 10,474,277 B2
(45) Date of Patent: Nov. 12, 2019

(54) POSITION-BASED STYLUS COMMUNICATION

(71) Applicant: Apple Inc., Cupertino, CA (US)

(72) Inventors: Vivek Pant, San Jose, CA (US); Moshe Malkin, Palo Alto, CA (US); Shahrooz Shahparnia, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/169,679

(22) Filed: May 31, 2016

(65) Prior Publication Data

US 2017/0344174 A1   Nov. 30, 2017

(51) Int. Cl.
*G06F 3/041* (2006.01)
*G06F 3/044* (2006.01)
*G06F 3/0354* (2013.01)

(52) U.S. Cl.
CPC ........ *G06F 3/0416* (2013.01); *G06F 3/03545* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 3,462,692 A | 8/1969 | Bartlett | |
| 3,970,846 A | 7/1976 | Schofield et al. | |
| 4,220,815 A | 9/1980 | Gibson et al. | |
| 4,281,407 A | 7/1981 | Tosima | |
| 4,289,927 A | 9/1981 | Rodgers | |
| 4,320,292 A | 3/1982 | Oikawa et al. | |
| 4,334,219 A | 6/1982 | Paülus et al. | |
| 4,345,248 A | 8/1982 | Togashi et al. | |
| 4,405,921 A | 9/1983 | Mukaiyama | |
| 4,439,855 A | 3/1984 | Dholakia | |
| 4,476,463 A | 10/1984 | Ng et al. | |
| 4,481,510 A | 11/1984 | Hareng et al. | |

(Continued)

FOREIGN PATENT DOCUMENTS

| CN | 1243282 A | 2/2000 |
|---|---|---|
| CN | 1278348 A | 12/2000 |

(Continued)

OTHER PUBLICATIONS

Final Office Action dated Jun. 3, 2016, for U.S. Appl. No. 14/333,461, filed Jul. 16, 2014, eight pages.

(Continued)

*Primary Examiner* — Lunyi Lao
*Assistant Examiner* — Benjamin X Casarez
(74) *Attorney, Agent, or Firm* — Kubota & Basol LLP

(57) ABSTRACT

Position-based sensing methods and systems can be used to transmit data from an input device to a touch-sensitive device. For example, the touch sensing system may perform one or more coarse input device sub-scans to determine a coarse location of the input device. The coarse location can be used to select one or more touch sensors (or sensor channels) to sample for decoding data encoded in the stimulation signals from the input device. During one or more fine input device sub-scans, the touch sensing system can determine a fine location of the input device and decode the data from the input device sampled from the selected touch sensors (or sensor channels).

22 Claims, 11 Drawing Sheets

(56) References Cited

U.S. PATENT DOCUMENTS

| | | |
|---|---|---|
| 4,484,179 A | 11/1984 | Kasday |
| 4,490,607 A | 12/1984 | Pease et al. |
| 4,496,981 A | 1/1985 | Ota |
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Caswell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,117 A | 5/2000 | Fujimoto |
| 6,064,374 A | 5/2000 | Fukuzaki |

(56) References Cited

U.S. PATENT DOCUMENTS

| | | |
|---|---|---|
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,454,482 B1 | 9/2002 | Silverbrook et al. |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,642,238 B2 | 11/2003 | Toyoda |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,833 B1 | 3/2006 | Bodenmann et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 | 11/2007 | Morag et al. |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Stern et al. |
| 8,537,126 B2 | 9/2013 | Yousefpor et al. |

(56) References Cited

U.S. PATENT DOCUMENTS

| | | |
|---|---|---|
| 8,552,986 B2 | 10/2013 | Wong et al. |
| 8,581,870 B2 | 11/2013 | Bokma et al. |
| 8,605,045 B2 | 12/2013 | Mamba et al. |
| 8,659,556 B2 | 2/2014 | Wilson |
| 8,698,769 B2 | 4/2014 | Coulson et al. |
| 8,723,825 B2 | 5/2014 | Wright et al. |
| 8,816,985 B1 | 8/2014 | Tate et al. |
| 8,847,899 B2 | 9/2014 | Washburn et al. |
| 8,928,635 B2 | 1/2015 | Harley et al. |
| 8,933,899 B2 | 1/2015 | Shahparnia et al. |
| 9,013,429 B1 * | 4/2015 | Krekhovetskyy ... G06F 3/03545 345/173 |
| 9,092,086 B2 | 7/2015 | Krah et al. |
| 9,146,414 B2 | 9/2015 | Chang et al. |
| 9,170,681 B2 | 10/2015 | Huang et al. |
| 9,201,523 B1 | 12/2015 | Hwang et al. |
| 9,310,923 B2 | 4/2016 | Krah et al. |
| 9,310,943 B1 * | 4/2016 | Omelchuk ............ G06F 3/044 |
| 9,329,703 B2 | 5/2016 | Falkenburg et al. |
| 9,377,905 B1 | 6/2016 | Grivna et al. |
| 9,519,361 B2 | 12/2016 | Harley et al. |
| 9,557,845 B2 | 1/2017 | Shahparnia |
| 9,582,105 B2 | 2/2017 | Krah et al. |
| 9,652,090 B2 | 5/2017 | Tan et al. |
| 9,921,684 B2 | 3/2018 | Falkenburg et al. |
| 9,939,935 B2 | 4/2018 | Shahparnia |
| 10,048,775 B2 | 8/2018 | Shahparnia et al. |
| 10,061,449 B2 | 8/2018 | Shahparnia et al. |
| 10,061,450 B2 | 8/2018 | Shahparnia et al. |
| 10,067,580 B2 | 9/2018 | Shahparnia |
| 10,067,618 B2 | 9/2018 | Verma |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0103589 A1 | 6/2003 | Nohara et al. |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | den Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | den Boer et al. |
| 2003/0218116 A1 | 11/2003 | den Boer et al. |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | den Boer et al. |
| 2004/0081205 A1 | 4/2004 | Coulson |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0275616 A1 | 12/2005 | Park et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0012580 A1 | 1/2006 | Perski et al. |
| 2006/0034492 A1 | 2/2006 | Siegel et al. |
| 2006/0120013 A1 | 6/2006 | Dioro et al. |
| 2006/0125971 A1 | 6/2006 | Abileah et al. |
| 2006/0159478 A1 | 7/2006 | Kikuchi |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2006/0284854 A1 | 12/2006 | Cheng et al. |
| 2007/0030258 A1 | 2/2007 | Pittel et al. |
| 2007/0062852 A1 | 3/2007 | Zachut et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0146349 A1 | 6/2007 | Errico |
| 2007/0216905 A1 | 9/2007 | Han et al. |
| 2007/0229468 A1 | 10/2007 | Peng et al. |
| 2007/0279346 A1 | 12/2007 | den Boer et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055507 A1 | 2/2008 | den Boer et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | den Boer et al. |
| 2008/0142280 A1 | 6/2008 | Yamamoto et al. |
| 2008/0158165 A1 | 7/2008 | Geaghan et al. |
| 2008/0158167 A1 | 7/2008 | Hotelling et al. |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |

(56) References Cited

U.S. PATENT DOCUMENTS

| | | |
|---|---|---|
| 2008/0170046 A1 | 7/2008 | Rimon et al. |
| 2008/0238885 A1 | 10/2008 | Zachut et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2008/0309631 A1 | 12/2008 | Westerman et al. |
| 2009/0000831 A1 | 1/2009 | Miller et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0153152 A1 | 6/2009 | Maharyta et al. |
| 2009/0153525 A1 | 6/2009 | Lung |
| 2009/0167713 A1 | 7/2009 | Edwards |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1 | 4/2010 | King-Smith et al. |
| 2010/0118237 A1 | 5/2010 | Katoh et al. |
| 2010/0127991 A1 | 5/2010 | Yee |
| 2010/0155153 A1 | 6/2010 | Zachut |
| 2010/0160041 A1 | 6/2010 | Grant et al. |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0309171 A1 | 12/2010 | Hsieh et al. |
| 2010/0315384 A1 | 12/2010 | Hargreaves et al. |
| 2010/0315394 A1 | 12/2010 | Katoh et al. |
| 2010/0321320 A1 | 12/2010 | Hung et al. |
| 2010/0322484 A1 | 12/2010 | Hama et al. |
| 2010/0327882 A1 | 12/2010 | Shahparnia et al. |
| 2010/0328249 A1 | 12/2010 | Ningrat et al. |
| 2011/0001708 A1 | 1/2011 | Sleeman |
| 2011/0007029 A1 | 1/2011 | Ben-David |
| 2011/0042152 A1* | 2/2011 | Wu .................. G06F 3/0416 178/18.03 |
| 2011/0043489 A1 | 2/2011 | Yoshimoto |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1 | 4/2011 | Maridakis |
| 2011/0153263 A1* | 6/2011 | Oda ................. G06F 3/03545 702/150 |
| 2011/0155479 A1 | 6/2011 | Oda et al. |
| 2011/0157066 A1 | 6/2011 | Parker et al. |
| 2011/0169771 A1 | 7/2011 | Fujioka et al. |
| 2011/0175834 A1 | 7/2011 | Han et al. |
| 2011/0193776 A1* | 8/2011 | Oda ..................... G06F 3/046 345/157 |
| 2011/0216016 A1 | 9/2011 | Rosener |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304577 A1 | 12/2011 | Brown et al. |
| 2011/0304592 A1 | 12/2011 | Booth et al. |
| 2012/0013555 A1 | 1/2012 | Takami et al. |
| 2012/0019488 A1 | 1/2012 | McCarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1 | 5/2012 | Kremin et al. |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon |
| 2012/0327041 A1 | 12/2012 | Harley |
| 2013/0021294 A1 | 1/2013 | Maharyta et al. |
| 2013/0027361 A1 | 1/2013 | Perski et al. |
| 2013/0033461 A1 | 2/2013 | Silverbrook |
| 2013/0069905 A1 | 3/2013 | Krah et al. |
| 2013/0088465 A1 | 4/2013 | Geller et al. |
| 2013/0100071 A1 | 4/2013 | Wright et al. |
| 2013/0106714 A1 | 5/2013 | Shahparnia et al. |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0141342 A1 | 6/2013 | Bokma et al. |
| 2013/0155007 A1 | 6/2013 | Huang et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1 | 10/2013 | Zeliff et al. |
| 2014/0028576 A1 | 1/2014 | Shahparnia |
| 2014/0028577 A1* | 1/2014 | Krah .................. G06F 3/0416 345/173 |
| 2014/0028607 A1 | 1/2014 | Tan |
| 2014/0077827 A1 | 3/2014 | Seguine |
| 2014/0132556 A1 | 5/2014 | Huang |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0184554 A1* | 7/2014 | Walley .............. G06F 3/0416 345/174 |
| 2014/0253462 A1 | 9/2014 | Hicks |
| 2014/0253469 A1 | 9/2014 | Hicks et al. |
| 2014/0267071 A1* | 9/2014 | Shahparnia ....... G06F 3/03545 345/173 |
| 2014/0267075 A1 | 9/2014 | Shahparnia et al. |
| 2014/0267184 A1 | 9/2014 | Bathiche et al. |
| 2014/0347311 A1* | 11/2014 | Joharapurkar ........ G06F 3/044 345/174 |
| 2014/0354555 A1 | 12/2014 | Shahparnia et al. |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1* | 2/2015 | Shahparnia .......... G06F 3/041 345/174 |
| 2015/0103049 A1 | 4/2015 | Harley et al. |

(56) References Cited

U.S. PATENT DOCUMENTS

| | | | |
|---|---|---|---|
| 2015/0177868 A1* | 6/2015 | Morein | G06F 3/044 345/174 |
| 2015/0338950 A1 | 11/2015 | Ningrat et al. | |
| 2015/0363012 A1 | 12/2015 | Sundara-Rajan et al. | |
| 2016/0014598 A1* | 1/2016 | Westhues | H04W 12/04 380/259 |
| 2016/0077667 A1 | 3/2016 | Chiang et al. | |
| 2016/0162011 A1 | 6/2016 | Verma | |
| 2016/0162101 A1 | 6/2016 | Pant et al. | |
| 2016/0162102 A1 | 6/2016 | Shahparnia et al. | |
| 2016/0179281 A1 | 6/2016 | Krah et al. | |
| 2016/0337496 A1* | 11/2016 | Jeganathan | H04M 1/7253 |
| 2016/0357343 A1 | 12/2016 | Falkenburg et al. | |
| 2016/0378220 A1* | 12/2016 | Westhues | G06F 3/0416 345/174 |
| 2017/0097695 A1* | 4/2017 | Ribeiro | G06F 3/0383 |
| 2017/0115816 A1* | 4/2017 | Chang | G06F 3/0416 |
| 2019/0095006 A1 | 3/2019 | Shahparnia | |

FOREIGN PATENT DOCUMENTS

| | | |
|---|---|---|
| CN | 1518723 A | 8/2004 |
| CN | 201329722 Y | 10/2009 |
| CN | 101393488 B | 10/2010 |
| CN | 201837984 U | 5/2011 |
| DE | 036 02 796 A1 | 8/1987 |
| DE | 197 20 925 A1 | 12/1997 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 1 884 863 A1 | 2/2008 |
| EP | 2 040 149 A2 | 3/2009 |
| EP | 2 172 834 A2 | 4/2010 |
| EP | 2 221 659 A1 | 8/2010 |
| EP | 2 660 689 A1 | 11/2013 |
| JP | 55-074635 A | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | 05-243547 A | 9/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 5/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| JP | 2005-352490 A | 12/2005 |
| JP | 2009-054141 A | 3/2009 |
| KR | 10-2013-0026360 A | 3/2013 |
| KR | 10-2013-0109207 A | 10/2013 |
| TW | 200743986 A | 12/2007 |
| TW | 200925944 | 6/2009 |
| TW | 201115414 A | 5/2011 |
| TW | 201118682 A1 | 6/2011 |
| TW | 201324242 A1 | 6/2013 |
| TW | 201419103 A | 5/2014 |
| TW | 201504874 A | 2/2015 |
| WO | WO-97/40488 A1 | 10/1997 |
| WO | WO-99/21160 A1 | 4/1999 |
| WO | WO-99/22338 A1 | 5/1999 |
| WO | WO-01/45283 A1 | 6/2001 |
| WO | WO-2006/104214 A1 | 10/2006 |
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2011/008533 A2 | 1/2011 |
| WO | WO-2012/177567 A1 | 12/2012 |
| WO | WO-2012/177571 A1 | 12/2012 |
| WO | WO-2012/177573 A2 | 12/2012 |
| WO | WO-2012/177569 A2 | 3/2013 |
| WO | WO-2012/177569 A3 | 3/2013 |
| WO | WO-2014/018233 A1 | 1/2014 |
| WO | WO-2014/143430 A1 | 9/2014 |
| WO | WO-2015/017196 A1 | 2/2015 |

OTHER PUBLICATIONS

Non-Final Office Action dated Jul. 1, 2016, for U.S. Appl. No. 14/333,457, filed Jul. 16, 2014, 27 pages.

TW Search Report dated Jun. 23, 2016, for TW Patent Application No. 104135140, with English Translation, two pages.

Non-Final Office Action dated Jul. 28, 2016, for U.S. Appl. No. 13/560,963, filed Jul. 27, 2012, twelve pages.

Notice of Allowance dated Aug. 10, 2016, for U.S. Appl. No. 14/578,051, filed Dec. 19, 2014, seven pages.

Non-Final Office Action dated Sep. 27, 2016, for U.S. Appl. No. 15/144,615, filed May 2, 2016, five pages.

Notice of Allowance dated Sep. 9, 2016, for U.S. Appl. No. 13/560,958, filed Jul. 27, 2012, eight pages.

Non-Final Office Action dated Oct. 20, 2016, for U.S. Appl. No. 13/166,699, filed Jun. 22, 2011, 16 pages.

Notice of Allowance dated Oct. 31, 2016, for U.S. Appl. No. 15/057,035, filed Feb. 29, 2016, ten pages.

Non-Final Office Action dated Nov. 25, 2016, for U.S. Appl. No. 13/831,318, filed Mar. 14, 2013, eight pages.

Non-Final Office Action dated Jan. 11, 2017, for U.S. Appl. No. 14/869,982, filed Sep. 29, 2015, nine pages.

Non-Final Office Action dated Jan. 12, 2017, for U.S. Appl. No. 14/869,980, filed Sep. 29, 2015, ten pages.

Non-Final Office Action dated Jan. 23, 2017, for U.S. Appl. No. 14/333,382, filed Jul. 16, 2014, sixteen pages.

Notice of Allowance dated Feb. 14, 2017, for U.S. Appl. No. 13/560,963, filed Jul. 27, 2012, nine pages.

Non-Final Office Action dated Apr. 6, 2107, for U.S. Appl. No. 14/333,461, filed Jul. 16, 2014, six pages.

Final Office Action dated May 4, 2017, for U.S. Appl. No. 15/144,615, filed May 2, 2016, five pages.

(56) References Cited

OTHER PUBLICATIONS

Final Office Action dated May 31, 2017, for U.S. Appl. No. 13/166,699, filed Jun. 22, 2011, 16 pages.
Final Office Action dated Jun. 21, 2017, for U.S. Appl. No. 14/333,382, filed Jul. 16, 2014, 17 pages.
Final Office Action dated Aug. 7, 2017, for U.S. Appl. No. 14/869,980, filed Sep. 29, 2015, twelve pages.
Final Office Action dated Aug. 16, 2017, for U.S. Appl. No. 14/869,982, filed Sep. 29, 2015, ten pages.
Final Office Action dated Aug. 21, 2017, for U.S. Appl. No. 14/831,318, filed Mar. 14, 2013, nine pages.
Abileah, A. et al, (2004). "59.3: Integrated Optical Touch Panel in a 14.1' AMLCD," *SID '04 Digest* (Seattle) pp. 1544-1547.
Abileah, A. et al. (2006). "9.3: Optical Sensors Embedded within AMLCD Panel: Design and Applications," *ADEAC '06, SID* (Atlanta) pp. 102-105.
Abileah, A. et al. (2007). "Optical Sensors Embedded within AMLCD Panel: Design and Applications," *Siggraph-07*, San Diego, 5 pages.
Anonymous. (2002). "Biometric Smart Pen Project," located at http://www.biometricsmartpen.de/ . . . , last visited Apr. 19, 2011, one page.
Bobrov, Y. et al. (2002). "5.2 Manufacturing of a Thin-Film LCD," *Optiva, Inc.*, San Francisco, CA. 4 pages.
Brown, C. et al. (2007). "7.2: A 26 inch VGA LCD with Optical Input Function using a 1-Transistor Active-Pixel Sensor," *ISSCC 2007* pp. 132-133, 592.
Den Boer, W. et al. (2003). "56.3: Active Matrix LCD with Integrated Optical Touch Screen," *SID '03 Digest* (Baltimore) pp. 1-4.
Chinese Search Report dated Sep. 6, 2015, for CN Application No. CN 201280030349.9, with English translation, six pages.
Chinese Search Report dated Oct. 23, 2015, for on Application No. CN 201280030351.6, with English translation, four pages.
Echtler, F. et al. (Jan. 2010). "An LED-based Multitouch Sensor for LCD Screens," Cambridge, MA *ACM* 4 pages.
European Search Report dated May 2, 2016, for EP Application No. 15196245.3, filed Nov. 25, 2015, twelve pages.
Final Office Action dated Mar. 4, 2004, for U.S. Appl. No. 10/217,798, filed Aug. 12, 2002, 17 pages.
Final Office Action dated Jan. 21, 2005, for U.S. Appl. No. 10/329,217, filed Dec. 23, 2002, 13 pages.
Final Office Action dated Aug. 9, 2005, for U.S. Appl. No. 10/442,433, filed May 20, 2003, six pages.
Final Office Action dated Aug. 23, 2005, for U.S. Appl. No. 10/217,798, filed Aug. 12, 2002, 10 pages.
Final Office Action dated Dec. 13, 2005, for U.S. Appl. No. 10/371,413, filed Feb. 20, 2003, six pages.
Final Office Action dated May 23, 2007, for U.S. Appl. No. 11/137,753, filed May 25, 2005, 11 pages.
Final Office Action dated Oct. 18, 2007, for U.S. Appl. No. 11/351,098, filed Feb. 8, 2006, six pages.
Final Office Action dated Oct. 31, 2007, for U.S. Appl. No. 10/217,798, filed Aug. 12, 2002, nine pages.
Final Office Action dated Mar. 24, 2009, for U.S. Appl. No. 11/351,093, filed Feb. 8, 2006, 10 pages.
Final Office Action dated Feb. 10, 2011, for U.S. Appl. No. 11/901,649, filed Sep. 18, 2007, 20 pages.
Final Office Action dated May 18, 2011, for U.S. Appl. No. 11/978,031, filed Oct. 25, 2007, 17 pages.
Final Office Action dated Jun. 15, 2011, for U.S. Appl. No. 11/595,071, filed Nov. 8, 2006, 9 pages.
Final Office Action dated Jun. 24, 2011, for U.S. Appl. No. 11/978,006, filed Oct. 25, 2007, 12 pages.
Final Office Action dated Jul. 5, 2011, for U.S. Appl. No. 11/977,279, filed Oct. 24, 2007, 12 pages.
Final Office Action dated Sep. 29, 2011, for U.S. Appl. No. 11/977,911, filed Oct. 26, 2007, 22 pages.
Final Office Action dated Oct. 11, 2012, for U.S. Appl. No. 12/566,455, filed Sep. 24, 2009, 8 pages.
Final Office Action dated Oct. 25, 2012, for U.S. Appl. No. 12/568,302, filed Sep. 28, 2009, 13 pages.
Final Office Action dated Oct. 25, 2012, for U.S. Appl. No. 12/568,316, filed Sep. 28, 2009, 15 pages.
Final Office Action dated Jul. 26, 2013, for U.S. Appl. No. 13/166,726, filed Jun. 22, 2011, ten pages.
Final Office Action dated Oct. 31, 2013, for U.S. Appl. No. 13/166,699, filed Jun. 22, 2011, 13 pages.
Final Office Action dated Jan. 13, 2014, for U.S. Appl. No. 12/568,316, filed Sep. 28, 2009, 15 pages.
Final Office Action dated Apr. 28, 2014, for U.S. Appl. No. 13/652,007, filed Oct. 15, 2012, 16 pages.
Office Action dated Jul. 14, 2014, for U.S. Appl. No. 13/166,711, filed Jun. 22, 2011, 12 pages.
Final Office Action dated Dec. 2, 2014, for U.S. Appl. No. 13/560,963, filed Jul. 27, 2012, ten pages.
Final Office Action dated Dec. 16, 2014, for U.S. Appl. No. 13/560,958, filed Jul. 27, 2012, twelve pages.
Final Office Action dated Jan. 12, 2015, for U.S. Appl. No. 13/560,973, filed Jul. 27, 2012, six pages.
Final Office Action dated May 4, 2015, for U.S. Appl. No. 13/166,699, filed Jun. 22, 2011, 17 pages.
Final Office Action dated Aug. 20, 2015, for U.S. Appl. No. 13/166,711, filed Jun. 22, 2011, six pages.
Final Office Action dated Feb. 1, 2016, for U.S. Appl. No. 13/560,963, filed Jul. 27, 2012, 12 pages.
Final Office Action dated Feb. 3, 2016, for U.S. Appl. No. 13/166,699, filed Jun. 22, 2011, 15 pages.
Final Office Action dated Mar. 9, 2016, for U.S. Appl. No. 13/831,318, filed Mar. 14, 2013, nine pages.
Hong, S.J. et al. (2005). "Smart LCD Using a-Si Photo Sensor," *IMID '05 Digest* pp. 280-283.
International Preliminary Report on Patentability and Written Opinion dated Oct. 8, 2004, for PCT Application No. PCT/US03/05300, filed Feb. 20, 2003, 15 pages.
International Preliminary Report on Patentability and Written Opinion dated Dec. 30, 2004, for PCT Application No. PCT/US02/25573, filed Aug. 12, 2002, 16 pages.
International Preliminary Report on Patentability and Written Opinion dated May 14, 2008, for PCT Application No. PCT/US06/43741, filed Nov. 10, 2006, four pages.
International Search Report dated Apr. 14, 2003, for PCT Application No. PCT/US02/25573, filed Aug. 12, 2002 two pages.
International Search Report dated Jun. 16, 2003, for PCT Application No. PCT/US03/05300, filed Feb. 20, 2003, two pages.
International Search Report dated Nov. 11, 2003, for PCT Application No. PCT/US03/03277, filed Feb. 4, 2003, three pages.
International Search Report dated Sep. 21, 2007, for PCT Application No. PCT/US06/43741, filed Nov. 10, 2006, one page.
International Search Report dated Oct. 17, 2012, for PCT Application No. PCT/U52012/043019, filed Jun. 18, 2012, five pages.
International Search Report dated Oct. 17, 2012, for PCT Application No. PCT/US2012/043023, filed Jun. 18, 2012, six pages.
International Search Report dated Jan. 16, 2013, for PCT Application No. PCT/US2012/043021, filed Jun. 18, 2012, six pages.
International Search Report dated Sep. 12, 2013, for PCT Application No. PCT/US2013/048977, filed Jul. 1, 2013, six pages.
International Search Report dated Apr. 23, 2014, for PCT Application No. PCT/US2014/013927, filed Jan. 30, 2014, four pages.
International Search Report dated Oct. 30, 2014,, for PCT Application No. PCT/US2014/047658, four pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmány Catholic University, Budapest, Hungary 122 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Jun. 4, 2003, for U.S. Appl. No. 10/217,798, filed Aug. 12, 2002, 16 pages.
Non-Final Office Action dated May 21, 2004, for U.S. Appl. No. 10/329,217, filed Dec. 23, 2002, 13 pages.

(56) References Cited

OTHER PUBLICATIONS

Non-Final Office Action dated Sep. 21, 2004, for U.S. Appl. No. 10/442,433, filed May 20, 2003, six pages.
Non-Final Office Action dated Nov. 26, 2004, for U.S. Appl. No. 10/307,106, filed Nov. 27, 2002, eight pages.
Non-Final Office Action dated Dec. 10, 2004, for U.S. Appl. No. 10/217,798, filed Aug. 12, 2002, nine pages.
Non-Final Office Action dated Jan. 21, 2005, for U.S. Appl. No. 10/347,149, filed Jan. 17, 2003, nine pages.
Non-Final Office Action dated Apr. 15, 2005, for U.S. Appl. No. 10/371,413, filed Feb. 20, 2003, four pages.
Non-Final Office Action dated Jun. 22, 2005, for U.S. Appl. No. 10/739,455, filed Dec. 17, 2003, 10 pages.
Non-Final Office Action dated Jul. 12, 2005, for U.S. Appl. No. 10/347,149, filed Jan. 17, 2003, four pages.
Non-Final Office Action dated Jan. 13, 2006, for U.S. Appl. No. 10/217,798, filed Aug. 12, 2002, nine pages.
Non-Final Office Action dated May 12, 2006, for U.S. Appl. No. 10/217,798, filed Aug. 12, 2002, seven pages.
Non-Final Office Action dated Aug. 28, 2006, for U.S. Appl. No. 10/371,413, filed Feb. 20, 2003, six pages.
Non-Final Office Action dated Jun. 28, 2007, for U.S. Appl. No. 11/351,098, filed Feb. 8, 2006, 12 pages.
Non-Final Office Action dated Jun. 29, 2007, for U.S. Appl. No. 10/217,798, filed Aug. 12, 2002, 10 pages.
Non-Final Office Action dated Feb. 25, 2008, for U.S. Appl. No. 11/137,753, filed May 25, 2005, 15 pages.
Non-Final Office Action dated Jun. 24, 2008, for U.S. Appl. No. 11/351,098, filed Feb. 8, 2006, 11 pages.
Non-Final Office Action dated Jun. 25, 2009, for U.S. Appl. No. 11/980,029, filed Oct. 29, 2007, 9 pages.
Non-Final Office Action dated Nov. 23, 2009, for U.S. Appl. No. 11/407,545, filed Apr. 19, 2006, five pages.
Non-Final Office Action dated Jul. 29, 2010, for U.S. Appl. No. 11/901,649, filed Sep. 18, 2007, 20 pages.
Non-Final Office Action dated Oct. 13, 2010, for U.S. Appl. No. 11/978,006, filed Oct. 25, 2007, eight pages.
Non-Final Office Action dated Oct. 14, 2010, for U.S. Appl. No. 11/595,071, filed Nov. 8, 2006, seven pages.
Non-Final Office Action dated Nov. 26, 2010, for U.S. Appl. No. 11/977,279, filed Oct. 24, 2007, nine pages.
Non-Final Office Action dated Nov. 26, 2010, for U.S. Appl. No. 11/977,830, filed Oct. 26, 2007, seven pages.
Non-Final Office Action dated Dec. 13, 2010, for U.S. Appl. No. 11/977,339, filed Oct. 24, 2007, eight pages.
Non-Final Office Action dated Feb. 1, 2011, for U.S. Appl. No. 11/978,031, filed Oct. 25, 2007, 18 pages.
Non-Final Office Action dated Apr. 29, 2011, for U.S. Appl. No. 11/977,911, filed Oct. 26, 2007, 19 pages.
Non-Final Office Action dated Jun. 21, 2011, for U.S. Appl. No. 11/977,339, filed Oct. 24, 2007, 10 pages.
Non-Final Office Action dated Jun. 28, 2011, for U.S. Appl. No. 12/852,883, filed Aug. 8, 2010, 16 pages.
Non-Final Office Action dated Nov. 2, 2011, for U.S. Appl. No. 12/568,316, filed Sep. 28, 2009, 31 pages.
Non-Final Office Action dated Nov. 4, 2011, for U.S. Appl. No. 12/568,302, filed Sep. 28, 2009, 29 pages.
Non-Final Office Action dated Nov. 17, 2011, for U.S. Appl. No. 11/977,339, filed Oct. 24, 2007, nine pages.
Non-Final Office Action dated Jan. 10, 2012, for U.S. Appl. No. 11/977,864, filed Oct. 26, 2007, six pages.
Non-Final Office Action dated Jan. 31, 2012, for U.S. Appl. No. 12/566,477, filed Sep. 24, 2009, 11 pages.
Non-Final Office Action dated Feb. 29, 2012, for U.S. Appl. No. 11/978,031, filed Oct. 25, 2007, 20 pages.
Non-Final Office Action dated Apr. 20, 2012, for U.S. Appl. No. 12/566,455, filed Sep. 24, 2009, eight pages.
Non-Final Office Action dated Jun. 5, 2012, for U.S. Appl. No. 11/595,071, filed Nov. 8, 2006, 14 pages.
Non-Final Office Action dated Jun. 19, 2012, for U.S. Appl. No. 11/977,864, filed Oct. 26, 2007, seven pages.
Non-Final Office Action dated Nov. 15, 2012, for U.S. Appl. No. 12/566,477, filed Sep. 24, 2009, 11 pages.
Non-Final Office Action dated Mar. 5, 2013, for U.S. Appl. No. 13/166,726, filed Jun. 22, 2011, 14 pages.
Non-Final Office Action dated Mar. 29, 2013, for U.S. Appl. No. 13/166,699, filed Jun. 22, 2011, 12 pages.
Non-Final Office Action dated Jun. 17, 2013, for U.S. Appl. No. 13/166,711, filed Jun. 22, 2011, 8 pages.
Non-Final Office Action dated Sep. 18, 2013, for U.S. Appl. No. 13/652,007, filed Oct. 15. 2012, 16 pages.
Non-Final Office Action dated Dec. 16, 2013, for U.S. Appl. No. 13/166,711, filed Jun. 22, 2011, 12 pages.
Non-Final Office Action dated Feb. 27, 2014, for U.S. Appl. No. 11/977,279, filed Oct. 24, 2007, 11 pages.
Non-Final Office Action dated Mar. 14, 2014, for U.S. Appl. No. 11/977,339, filed Oct. 24, 2007, 10 pages.
Non-Final Office Action dated Apr. 24, 2014, for U.S. Appl. No. 13/560,958, filed Jul. 27, 2012, nine pages.
Non-Final Office Action dated May 8, 2014, for U.S. Appl. No. 13/560,973, filed Jul. 27, 2012, six pages.
Non-Final Office Action dated Jun. 4, 2014, for U.S. Appl. No. 13/560,963, filed Jul. 27, 2012, nine pages.
Non-Final Office Action dated Jun. 27, 2014, for U.S. Appl. No. 13/166,699, filed Jun. 22, 2011, 13 pages.
Non-Final Office Action dated Jan. 30, 2015, for U.S. Appl. No. 13/166,711, filed Jun. 22, 2011, 12 pages.
Non-Final Office Action dated May 14, 2015, for U.S. Appl. No. 13/560,963, filed Jul. 27, 2012, twelve pages.
Non-Final Office Action dated May 22, 2015, for U.S. Appl. No. 13/631,318, filed Mar. 14, 2013, eight pages.
Non-Final Office Action dated Aug. 28, 2015, for U.S. Appl. No. 13/560,958, filed Jul. 27, 2012, 11 pages.
Non-Final Office Action dated Sep. 24, 2015, for U.S. Appl. No. 13/166,699, filed Jun. 22, 2011, 14 pages.
Non-Final Office Action dated Dec. 4, 2015, for U.S. Appl. No. 14/333,461, filed Jul. 16, 2014, 15 pages.
Non-Final Office Action dated Feb. 11, 2016, for U.S. Appl. No. 14/578,051, filed Dec. 19, 2014, nine pages.
Non-Final Office Action dated May 13, 2016, for U.S. Appl. No. 15/057,035, filed Feb. 29, 2016, six pages.
Non-Final Office Action dated May 17, 2016, for U.S. Appl. No. 14/333,382, filed Jul. 16, 2014, sixteen pages.
Notice of Allowance dated May 12, 2014, for U.S. Appl. No. 13/166,726, filed Jun. 22, 2011, nine pages.
Notice of Allowance dated Sep. 4, 2014, for U.S. Appl. No. 13/166,726, filed Jun. 22, 2011, nine pages.
Notice of Allowance dated Dec. 15, 2015, for U.S. Appl. No. 13/560,973, filed Jul. 27, 2012, nine pages.
Notice of Allowance dated Jan. 14, 2016, for U.S. Appl. No. 13/166,711, filed Jun. 22, 2011, five pages.
Notice of Allowance dated May 24, 2016, for U.S. Appl. No. 13/560,958, filed Jul. 27, 2012, ten pages.
Notification of Reasons for Rejection dated Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
Rubine, D.H. (Dec. 1991). "The Automatic Recognition of Gestures,", Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Jun. 12, 2014, for ROC (Taiwan) Patent Application No. 101122110, one page.

(56) References Cited

OTHER PUBLICATIONS

TW Search Report dated Jul. 7, 2014, for TW Patent Application No. 101122109, filed Jun. 20, 2012, one page.
TW Search Report dated Jul. 8, 2014, for TW Patent Application No. 101122107, filed Jun. 20, 2012, one page.
TW Search Report dated Nov. 20, 2015, for TW Patent Application No. 103126285, one page.
Provisional U.S. Appl. No. 60/359,263, filed Feb. 20, 2002, by den Boer et al.
Provisional U.S. Appl. No. 60/383,040, filed May 23, 2002, by Abileah et al.
Provisional U.S. Appl. No. 60/736,708, filed Nov. 14, 2005, by den Boer et al.
Provisional U.S. Appl. No. 60/821,325, filed Aug. 3, 2006, by Abileah et al.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.
Notice of Allowance dated Jun. 6, 2018, for U.S. Appl. No. 14/869,980, filed Sep. 29, 2015, five pages.
Notice of Allowance dated Jun. 13, 2018, for U.S. Appl. No. 14/869,982, filed Sep. 29, 2015, five pages.
Final Office Action dated Nov. 30, 2017, for U.S. Appl. No. 14/333,457, filed Jul. 16, 2014, 22 pages.
Notice of Allowance dated Oct. 26, 2107, for U.S. Appl. No. 14/333,461, filed Jul. 16, 2014, seven pages.
Notice of Allowance dated Nov. 9, 2017, for U.S. Appl. No. 14/333,382, filed Jul. 16, 2014, eight pages.
Notice of Allowance dated Nov. 29, 2017, for U.S. Appl. No. 15/144,615, filed May 2, 2016, eight pages.
Non-Final Office Action dated Jan. 2, 2018, for U.S. Appl. No. 14/869,980, filed Sep. 29, 2015, eleven pages.
Non-Final Office Action dated Jan. 17, 2018, for U.S. Appl. No. 14/869,975, filed Sep. 29, 2015, 17 pages.
Non-Final Office Action dated Feb. 22, 2018, for U.S. Appl. No. 14/869,982, filed Sep. 29, 2015, ten pages.
Notice of Allowance dated Apr. 18, 2018, for U.S. Appl. No. 13/831,318, filed Mar. 14, 2013, ten pages.
Notice of Allowance dated Jun. 14, 2018, for U.S. Appl. No. 14/869,975, filed Sep. 29, 2015, eight pages.
Final Office Action dated Jan. 25, 2019, for U.S. Appl. No. 14/333,457, filed Jul. 16, 2014, 20 pages.

\* cited by examiner

POSITION-BASED STYLUS COMMUNICATION

FIELD OF DISCLOSURE

This relates generally to communication between input devices and computing devices, and more specifically, to position-based communication between an input device and computing device.

BACKGROUND OF DISCLOSURE

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision and control of the stylus. In some instances it may be desirable for input devices, such as styli, to be able to transfer data, in addition to a stimulation signal used to identify touch location, to the touch screen. For example, data from the input devices (such as force, orientation, tilt, or the like) may be communicated to the touch screen, which may use that data to change an output of the display or perform some other operation.

SUMMARY OF DISCLOSURE

In some examples herein, an input device and methods for transmitting data from the input device through a capacitive coupling or touch screen interface are disclosed. For example, an active stylus may generate stimulation signals that are received by a plurality of touch sensors of a touch sensitive display to detect the presence and location of the stylus. In some examples, the stylus stimulation signals can also include encoded data. The touch sensing system may select one or more touch sensors (or sense channels) proximate to the stylus to sample, receive, and decode the encoded data. In some examples, selecting the one or more touch sensors (or sense channels) to receive encoded data can reduce hardware requirements because data receiver channels are not required for each touch sensor (or touch sensor channel). To decode frequency-encoded stylus data, the touch sensing system can determine a frequency spectrum of the sampled data. Upon determining which frequency/frequencies are transmitted by the stylus, the data can be decoded.

In some examples, the touch sensing system may perform one or more coarse input device sub-scans to determine a coarse location of the input device. The coarse location can be used to select one or more touch sensors (or sensor channels) to sample for decoding data from the input device. During one or more fine input device sub-scans, the touch sensing system can determine a fine location of the input device and decode the data from the input device sampled from the selected touch sensors (or sensor channels).

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

In some examples herein, an input device and methods for transmitting data from the input device through a capacitive coupling or touch screen interface are disclosed. For example, an active stylus may generate stimulation signals that are received by a plurality of touch sensors of a touch sensitive display to detect the presence and location of the stylus. In some examples, the stylus stimulation signals can also include encoded data. The touch sensing system may select one or more touch sensors (or sense channels) proximate to the stylus to sample to receive and decode the encoded data. In some examples, selecting the one or more touch sensors (or sense channels) to receive encoded data can reduce hardware requirements because data receiver channels are not required for each touch sensor (or touch sensor channel). To decode frequency-encoded stylus data, the touch sensing system can determine a frequency spectrum of the sampled data. Upon determining which frequency/frequencies are transmitted by the stylus, the data can be decoded.

In some examples, the touch sensing system may perform one or more coarse input device sub-scans to determine a coarse location of the input device. The coarse location can be used to select one or more touch sensors (or sensor channels) to sample for decoding data from the input device. During one or more fine input device sub-scans, the touch sensing system can determine a fine location of the input device and decode the data from the input device sampled from the selected touch sensors (or sensor channels).

Figure 1A:
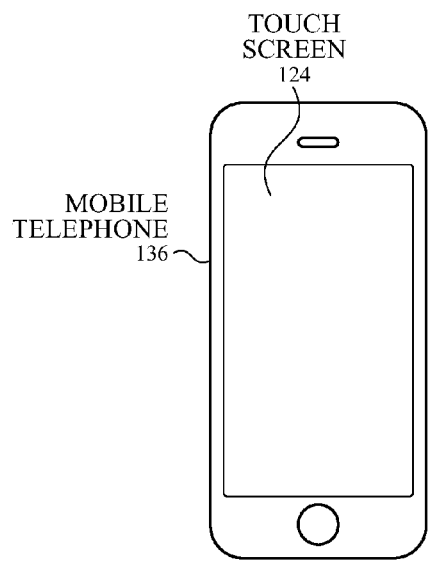
FIGS. 1A-1D illustrate examples of systems with touch screens that can accept input from an active stylus according to examples of the disclosure.
Figure 1B:
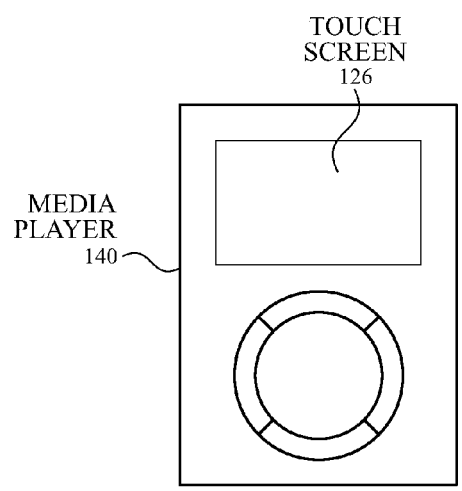
Figure 1C:
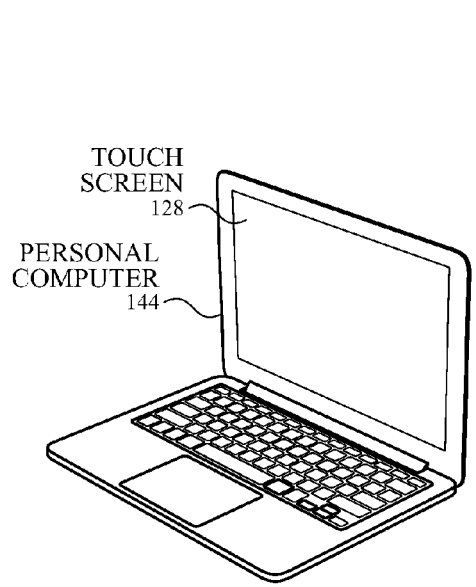
Figure 1D:
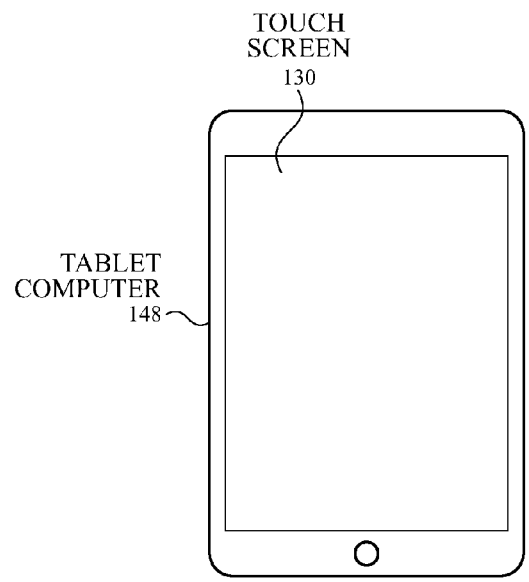

FIGS. 1A-1D illustrate examples of systems with touch screens that can accept input from an active stylus according to examples of the disclosure. FIG. 1A illustrates an exemplary mobile telephone 136 that includes a touch screen 124 that can accept input from an active stylus according to examples of the disclosure. FIG. 1B illustrates an example digital media player 140 that includes a touch screen 126 that can accept input from an active stylus according to examples of the disclosure. FIG. 1C illustrates an example personal computer 144 that includes a touch screen 128 that can accept input from an active stylus according to examples of the disclosure. In some examples, a personal computer 144 can include a trackpad that can accept input from an active stylus according to examples of the disclosure. Although generally described herein with regard to touch screens, active stylus input can be received by touch-sensitive surfaces without a display. FIG. 1D illustrates an example tablet computing device 148 that includes a touch screen 130 that can accept input from an active stylus according to examples of the disclosure. Other devices, including wearable devices, can accept input from an active stylus according to examples of the disclosure.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

In some examples, one or more touch sensors can detect signals from a powered stylus via mutual capacitance. Rather than generating a stimulation signal, the touch sensors can be used to receive coupled charge indicative of the stylus' stimulation signals. As the stylus approaches a touch sensor, charge coupling can occur between a conductive tip of the stylus (which can be driven by the stylus stimulation signal) and the touch sensor. This charge coupling can be received as an AC waveform indicative of stylus presence. In some examples, stylus stimulation signals can be sampled, analyzed, and decoded to receive data encoded in the stylus signal.

Figure 2:
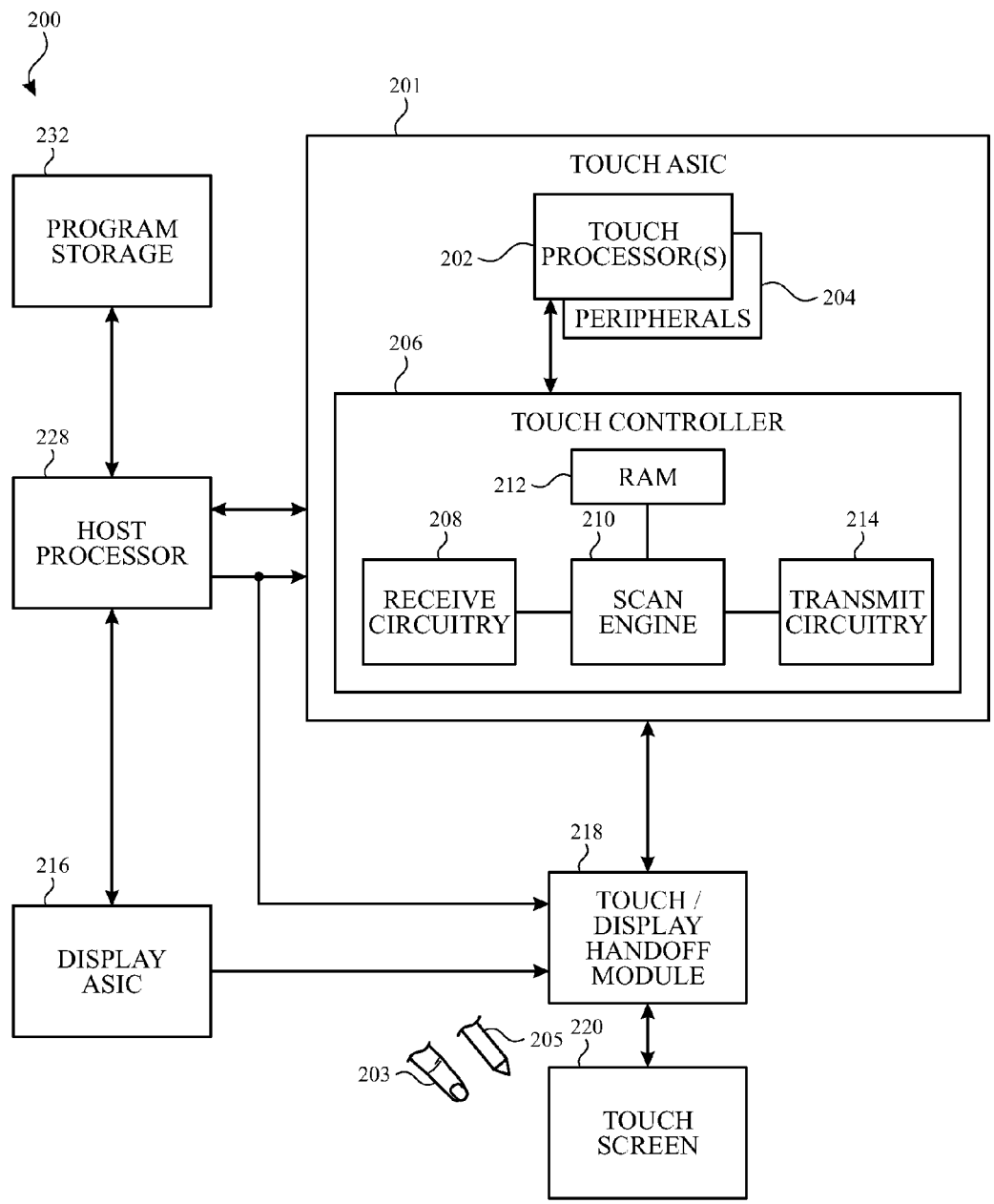
FIG. 2 illustrates a block diagram of an example computing system that can receive input from an active stylus according to examples of the disclosure.

FIG. 2 illustrates a block diagram of an example computing system 200 that can receive input from an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, pixelated sensor array scan, stylus data scan, stylus location scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed.

Results (e.g., touch/stylus signals or touch/stylus data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or a document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As described herein, host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WIFI®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies that the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
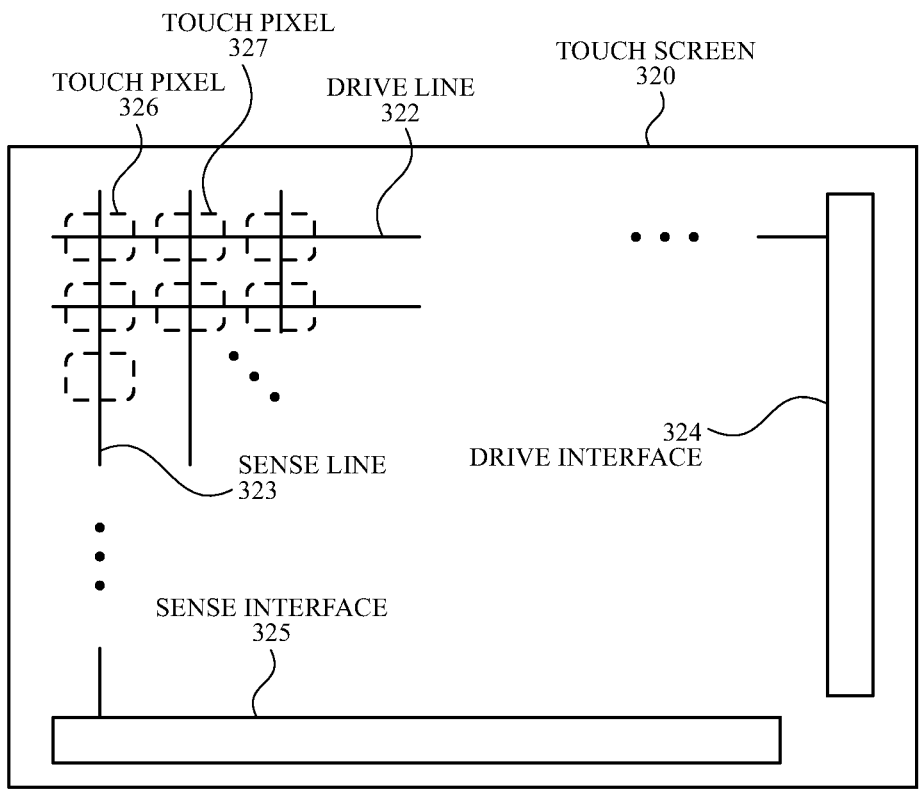
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit circuitry 214 through a drive interface 324, and resulting sense signals generated in sense lines 323 can be transmitted through a sense interface 325 to sense channels of receive circuitry 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans. The stylus scan can include one or more sub-scans as will be described below.

Figure 4:
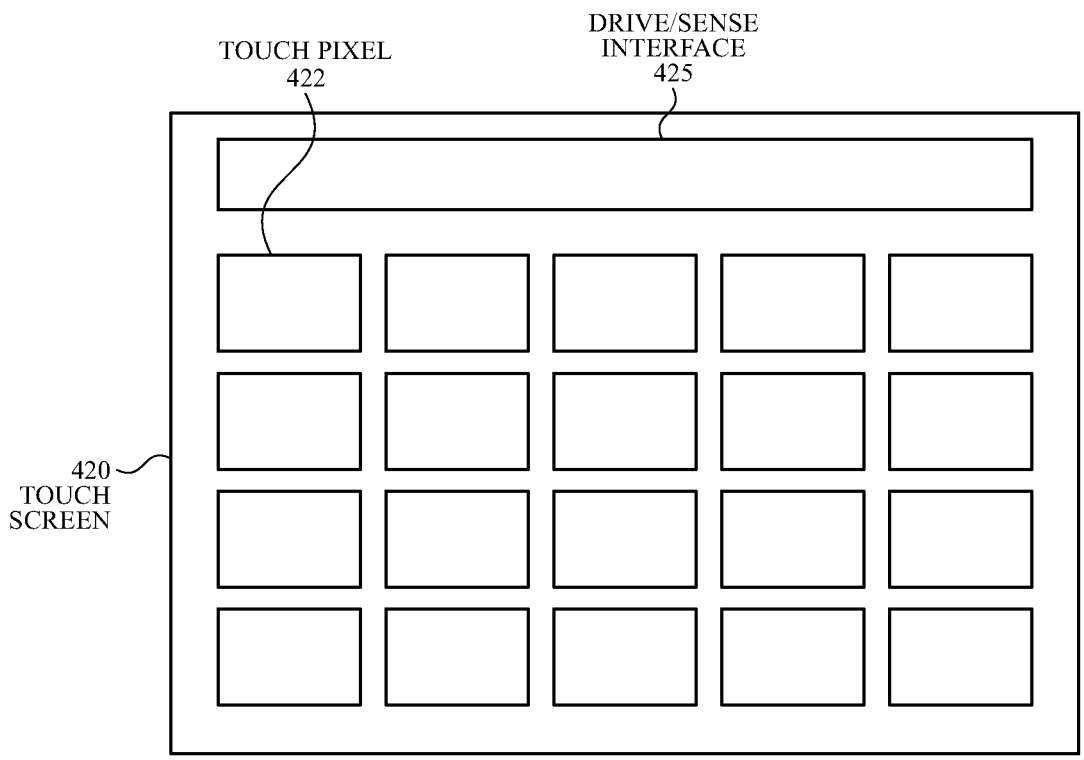
FIG. 4 illustrates an example touch screen including touch sensing circuitry configured as pixelated electrodes according to examples of the disclosure.

Additionally or alternatively, the touch screen can include touch sensing circuitry including an array of pixelated touch sensors. FIG. 4 illustrates an example touch screen including touch sensing circuitry configured as pixelated touch sensors according to examples of the disclosure. Touch screen 420 can include touch sensing circuitry that can include a capacitive sensing medium having a plurality of electrically isolated touch sensors, such as touch pixel 422 (e.g., a pixelated touch screen). For example, in a self-capacitance configuration, pixelated touch sensors 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., pixelated touch sensors 422) as "touch pixel electrodes" can be particularly useful when touch screen 420 is viewed as capturing an "image" of touch. In other words, after touch controller 206 has determined an amount of touch detected at each pixelated touch sensor 422 in touch screen 420, the pattern of pixelated touch sensors in the touch screen at which a touch occurred can be thought of as an "image" of touch (e.g., a pattern of fingers or other objects touching the touch screen). The pixelated touch screen can be used to sense mutual capacitance and/or self-capacitance. It should be understood that touch screen 220 can include any number of pixelated touch sensors to form the desired number and resolution of touch sensors. The electrodes of the touch sensor panel can be configured to perform various scans including some or all of mutual capacitance scans, self-capacitance scans, and stylus scans. The stylus scan can include one or more sub-scans as will be described below.

Figure 5:
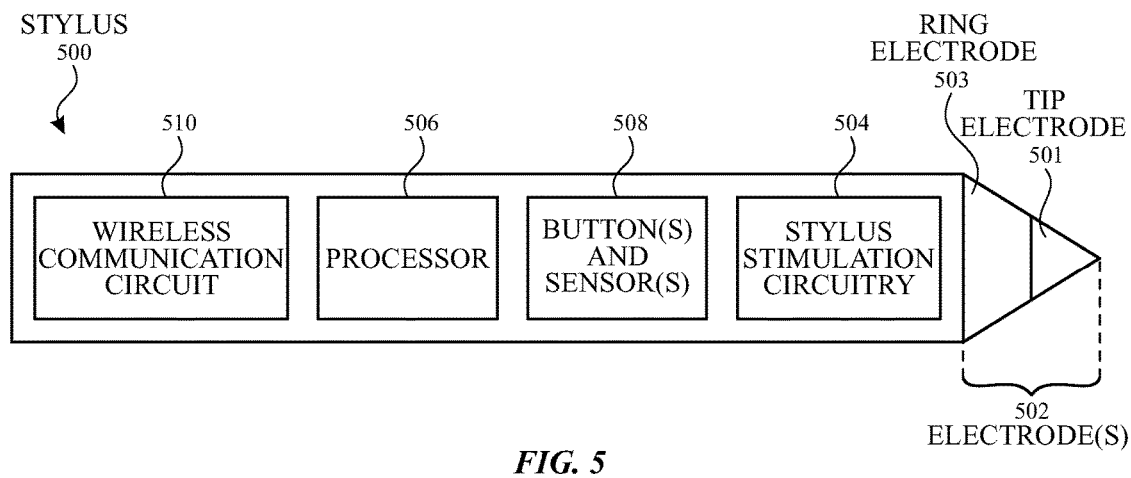
FIG. 5 illustrates an example active stylus according to examples of the disclosure.

As described herein, in addition to performing touch scans to detect an object such as a finger or a passive stylus, computing system 200 can also perform stylus scans to detect an active stylus and can communicate with a stylus. For example, an active stylus can be used as an input device on the surface of a touch screen of touch-sensitive device. FIG. 5 illustrates an example active stylus according to examples of the disclosure. Stylus 500 can include one or more electrodes 502, which can be located, for example, at a distal end of the stylus (e.g., the tip of the stylus). As illustrated in FIG. 5, stylus 500 can include a tip electrode 501 and a ring electrode 503. Tip electrode 501 can include a material capable of transmitting the stylus stimulation signal from stylus stimulation circuitry 504 to the touch-sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) or opaque material, or the like. In some examples, the stylus tip can have a diameter of 2 mm or less. In some examples, the stylus tip can have a diameter between 1 mm and 2 mm. Ring electrode 503 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO) or opaque material, or the like. In some examples, a transparent stylus tip and/or ring electrode can be used for projection purposes.

Stylus 500 can also include stylus stimulation circuitry 504. Stylus stimulation circuitry 504 can be configured to generate one or more stylus stimulation signals at the one or more electrodes 502 to stimulate a touch-sensitive device. For example, stylus stimulation signals can be coupled from stylus 500 to the touch sensing circuitry of touch screen 220, and the received signals can be processed by the touch ASIC 201. The received signals can be used to determine a location of active stylus 500 at the surface of touch screen 220. In some examples, the received signals can include encoded data. Host device 200 can perform stylus scans, as will be described below, to receive the stimulation signals and decode the data.

The operation of stylus stimulation circuitry 504 can be controlled by a processor 506. For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 500 can include more than one processor, and stylus stimulation circuitry 504 can include one or more processors. In some examples, one or more of the stylus functions described herein can be performed by firmware stored in memory or in program storage (not shown) and executed by processor 506 or a processor in stylus stimulation circuitry 504. In some examples, processor 506 can encode data into one or more stylus stimulation signals generated by stylus stimulation circuitry 504. The data can be frequency modulated, phased modulated, amplitude modulated or encoded in some other way. In some examples, the data can be indicative of a status of one or more buttons/and or sensors 508 as will be described below. In some examples, the data can be indicative of a status of the stylus itself or be used to establish a wireless communication channel (e.g., BLUETOOTH) between stylus 500 and host device 200.

In some examples, stylus 500 can also include one or more buttons and/or sensors 508. In some examples, buttons and/or sensors 508 can include a force sensor to detect the amount of force at the tip of the stylus 500. For example, when the stylus tip is touching touch screen 220, the force sensor can measure the force at the stylus tip. Information from one of the one or more sensors and/or buttons 508 can be stored in the stylus (e.g., in a memory (not shown)) and/or transmitted (via a wired connection or via a wireless communication channel) to the computing system 200. For example, the information can be communicated to host processor 228 or touch ASIC 201 in computing system 200. Sensor and/or button information and corresponding location information can be processed together by host processor 228 and/or touch ASIC 201.

In some examples, the one or more buttons and/or sensors 508 can be coupled to processor 506. Processor 506 can process information from the one or more buttons and/or sensors 508 and, based on the force information, control stylus stimulation circuitry 504 to generate or not generate stylus stimulation signals. For example, the processor can cause stylus stimulation circuitry 504 to generate no stylus stimulation signals when no force is detected or when the force is below a threshold level. When a force (or a force at or above the threshold level) is detected (e.g., corresponding to touch-down of the stylus), the processor can cause stylus stimulation circuitry 504 to generate stylus stimulation signals and continue generating stylus stimulation signals until the detected force drops below the threshold level (or some other threshold level). In some examples, stylus stimulation circuitry 504 can generate stylus stimulation signals indicative of a status of the one or more sensors and/or buttons 508. For example, the data can be encoded in the stylus stimulation signals as discussed above.

Stylus 500 can also include a wireless communication circuit 510, although in some examples the wireless communication functionality can be incorporated into other modules within the stylus 500, and in other examples the stylus can communicate via a wired connection. Wireless communication circuit 510 can transmit the button and sensor information from the stylus 500 to the wireless communication circuitry of computing system 200 via a wireless communication channel (e.g., BLUETOOTH). The wireless communication circuit 510 can also receive other information including, but not limited to, information about stylus stimulus frequencies, scan plan information (i.e., the sequence of scans to be performed by the touch-sensitive device) and clock synchronization information. In some examples, information, such as information about stylus stimulation frequencies and scan event plans, can be transmitted from touch ASIC 201 to the wireless communication unit of computing system 200 via host processor 228. In other examples, information, such as clock synchronization information, can be communicated directly from touch ASIC 201 to wireless communication unit of computing system 200.

Figure 6:
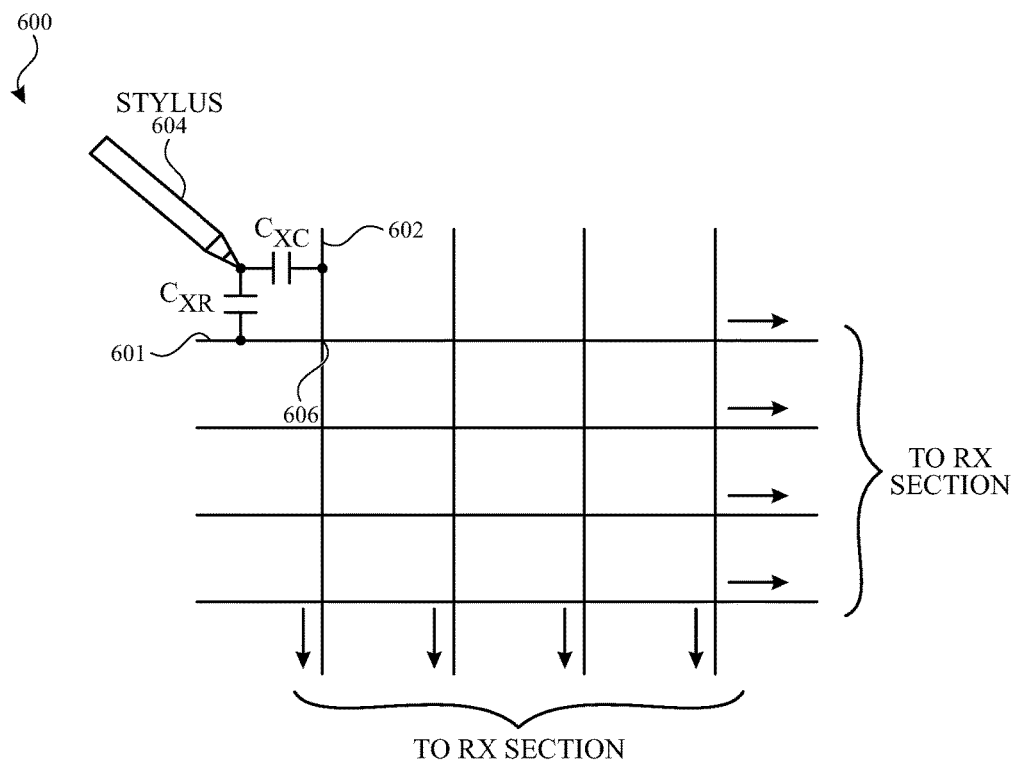
FIG. 6 illustrates an example touch sensor panel configuration operable with the touch ASIC of FIG. 2 to perform a stylus scan according to examples of the disclosure.

FIG. 6 illustrates an example touch sensor panel configuration operable with the touch ASIC of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the transmit circuitry 214 can be disabled, i.e., no stimulation signals Vstim from the touch controller are sent to touch sensor panel 600. The capacitive coupling (e.g., mutual capacitance) can be received by the receive circuitry 208 from the row and column traces of the one or more touch nodes 606 for processing. As described herein, in some examples the one or more stylus stimulation signals can have one or more frequencies indicative of or encoding a status of a sensor (e.g., a force sensor, motion sensor, orientation sensor), a button or switch, and/or a status of the stylus itself (e.g., battery life).

In some examples, one or more multiplexers can be used to couple row and/or column electrodes to the receive circuitry and/or transmit circuitry. For example, during a mutual capacitance touch sensing scan, row traces can be coupled to the transmit circuitry and column traces can be coupled to the receive circuitry. During a stylus sensing scan, column traces (or row traces) can be coupled via the one or more multiplexers to the receive circuitry to detect input from a stylus or other input device along one axis of the touch screen, and then the row traces (or column traces) can be coupled via the one or more multiplexers to the receive circuitry to detect input from a stylus or other input device along a second axis of the touch screen. The detected input can be used to determine the location of contact between a stylus or other input device and the touch sensor panel. In some examples, the row and column traces can be sensed simultaneously (i.e., both row and column traces concurrently coupled to the receive circuitry). In some examples, the stylus can be detected on the column traces concurrently with the mutual capacitance scan touch sensing scan. The touch and stylus signals can be differentiated by filtering and demodulating the received response signals at different frequencies. In some examples, a subset of detected input can be sampled therefrom and data encoded in a stylus stimulation signal can be detected and decoded, as will be described below.

Figure 7:
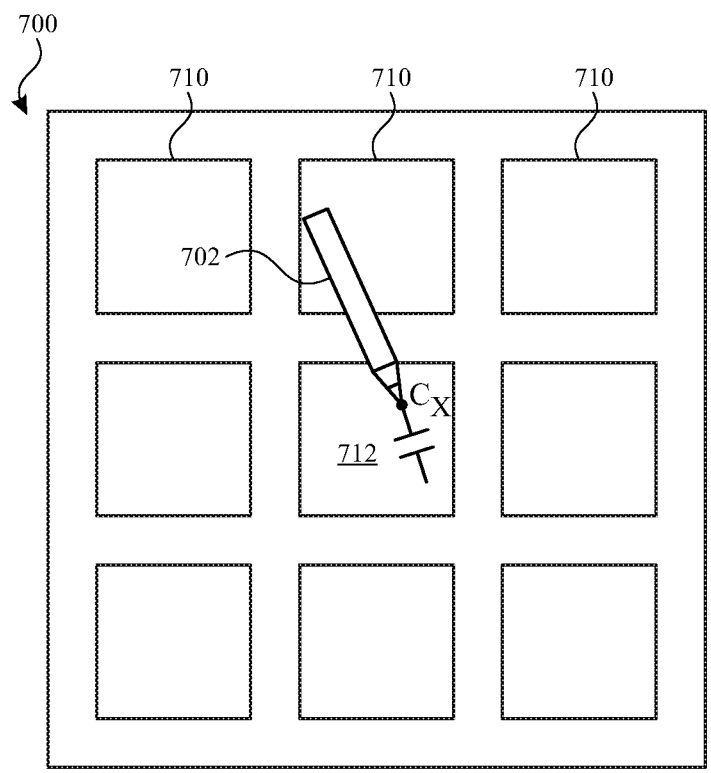
FIG. 7 illustrates an example touch sensor panel configuration operable with the touch ASIC of FIG. 2 to perform a stylus scan according to examples of the disclosure.

FIG. 7 illustrates an example touch sensor panel configuration operable with the touch ASIC of FIG. 2 to perform a stylus scan according to examples of the disclosure. For example, a stylus 702 can provide an input to touch sensor panel 700. In some examples, a touch sensor panel, such as touch sensor panel 700, can include an array of electrically isolated pixelated touch sensors 710, similar to pixelated touch sensor 422. During a stylus scan, one or more stimulation signals injected by stylus 702 can create capacitive coupling Cx between the stylus 702 and a touch sensor 712 included in panel 700. The capacitive coupling Cx between the stylus 702 and the touch sensors 710 can vary based on the proximity of stylus 702 to the touch sensors 710, for example. During the stylus scan, the transmit circuitry 214 can be disabled as described above, for example. In some examples, one or more stylus stimulation signals can have one or more frequencies indicative of or encoding a status of a sensor (e.g., a force sensor, motion sensor, orientation sensor), a button or switch, and/or a status of the stylus itself (e.g., battery life).

In some examples, one or more multiplexers can be used to couple one or more touch sensors of the array of touch sensors to receive and/or transmit circuitry. For example, to sense touch from a finger or passive stylus, one or more touch sensors can be stimulated and sensed. A resulting change in the self-capacitance to ground can indicate an object touching or proximate to the one or more touch sensors, for example. During a stylus scan, one or more touch sensors can be coupled via one or more multiplexers to receive circuitry to detect input from a stylus or other input device at the touch screen. The detected input can be used to determine the location of contact and/or proximity between a stylus or other input device and the touch sensor panel. In some examples, a subset of detected input can be sampled therefrom and data encoded in a stylus stimulation signal can be detected and decoded, as will be described below.

In summary, during a stylus scan, the transmit circuitry 214 can be disabled, i.e., no stimulation signals Vstim are sent to a touch sensor panel, according to the examples described with reference to FIGS. 1-4 and 6-7, while some or all of the touch sensors can be coupled to the receive circuitry. In some examples, touch sensors can be arranged as intersecting rows and columns, such as the examples of FIGS. 3 and 6. In some examples, touch sensors can be arranged in a pixelated array, such as the examples of FIGS. 4 and 7. The receive circuitry 208 can receive and process stylus signals from some or all of the touch sensors of the touch sensor panel in order to determine a location of the stylus. In some examples, a subset of touch sensors can also be sampled to collect encoded data in the stylus stimulation data, as will be described in more detail below.

Figure 8:
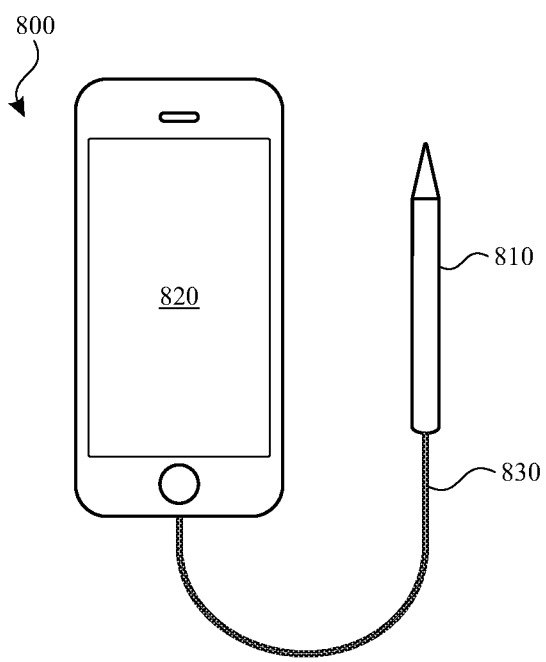
FIG. 8 illustrates an example pairing operation between a stylus and a host device via a wired connection according to examples of the disclosure.

In addition to communicating via a capacitive channel (e.g., through stylus signals received at one or more touch sensors), in some examples, an input device (e.g., stylus) and a host device can communicate over a wireless communication channel, such as BLUETOOTH, WIFI or any other suitable protocol. One or more of these communication methods may require an initial "pairing" operation before data can be exchanged. In some examples, a wired connection can be used to perform a pairing operation. FIG. 8 illustrates an example pairing operation 800 between a stylus 810 and a host device 820 via a wired connection 830 according to examples of the disclosure. Once connected via wired connection 830, data can be exchanged between the stylus 810 and the host device 820 to establish a wireless communication channel. After pairing is complete, wired connection 830 can be terminated and stylus 810 and host device 820 can communicate via a wireless communication channel.

In some examples, the pairing operation can be performed without a wired connection between the stylus and host device. For example, when the stylus 500 is not paired with computing system 200, the stylus can transmit information for setting up a wireless communication channel (e.g., BLUETOOTH, WIFI, etc.) via stimulation signals received at the touchscreen to the computing system 200. The information for setting up the wireless communication channel can be encoded in the stylus stimulation signals. Once the wireless communication channel has been established, the stylus can stop encoding and transmitting the pairing information. The stylus 500 can produce a plurality of stimulation frequencies to transmit frequency-encoded data, for example. In some examples, other encoding schemes, such as phase modulation and/or amplitude modulation, are possible.

In some examples, a wireless communication channel can be used to transmit data from one or more sensors (e.g., a force sensor, motion sensor, orientation sensor) of the stylus, a status of one or more switches included in the stylus, and/or a status of the stylus 810 itself. For example, a battery life of the stylus 810 can be transmitted. While using a wireless communication channel for data transmission, the host device 820 can receive stimulation signals from the stylus 810 via a plurality of capacitive touch sensors. Although receiving data through a dedicated wireless communication channel can simplify the hardware of the touch sensitive display, as data receive channels and decoders are not necessary, user experience can suffer due to high latency of data transmission. For example, a user may apply various amounts of force while drawing a line with stylus 810 on the surface of host device 820 to change a thickness of the line. When there is high latency caused by a wireless communication channel between stylus 810 and host device 820, the user can experience a delay between drawing a line and observing the line's thickness change. Additionally, using a wired connection 830 for pairing requires user action before a wireless communication channel can be established.

In some examples, an active stylus can encode data in a stimulation signal received by a host device. The data can include information for setting up a wireless communication channel (e.g., BLUETOOTH) with the host device, replacing the need for a wired setup as described above with reference to FIG. 8. Performing a pairing operation via stylus stimulation signals can be more convenient for a user of the stylus and host device than pairing via a wired connection, thereby providing a seamless and intuitive user experience. In some examples, once a wireless communication channel is established, the host device and the stylus can exchange data via a two-way communication channel. The data can include data from one or more sensors of the stylus, a status of the stylus (e.g., battery life), or other data.

In some examples, this data can be encoded in the stylus stimulation signal for one-way communication from the stylus to the host device. In some examples, transferring data by encoding it in a stimulation signal can be faster than transferring data through a two-way wireless communication channel such as Bluetooth. Additionally, transferring data by encoding it in a stimulation signal can provide for improved processing of the data with stylus location information by reducing the latency between receipt of the data (e.g., force) and stylus location information. In some examples, some data can be transferred both through the capacitive interface using stylus stimulation signals and some data via a wireless communication channel such as BLUETOOTH. For example, time-sensitive data can be transferred through the capacitive interface (e.g., force or tilt data can be provided via the capacitive interface along with location information to enable co-processing), where other types of data can be transferred via the wireless communication channel (e.g., stylus battery power state).

In some examples, a stylus can transmit encoded data via a stylus stimulation signal. The signal can be sampled by the host device at one or more capacitive touch sensors, such as those described above. In some examples, different circuitry can be used to decode stylus data and to detect the presence and location of a stylus. In some examples, each sense channel of the receive circuitry can include decoding circuitry (a decoding channel) configured to decode stylus data. Decoding circuitry for each sense channel, however, can add cost and increase power and/or space consumption for the receive circuitry. Alternatively, fewer decoding circuits or channels can be used in some examples. For example, the touch sensors can be coupled to the fewer decoding channels or the signals sampled from the touch sensors can be combined (e.g., averaged) before processing by the decoding channels. Coupling or otherwise combining touch sensors or signals from touch sensors can reduce hardware requirements, but can be detrimental to SNR. In some examples, fewer decoding channels can be used while also preserving SNR, by intelligently selecting a subset of touch sensors (or sense channels measuring the subset of touch sensors) proximate to the stylus during data transmission to be sampled and decoded by decoding circuitry, as will be described below. Although often described herein as implemented using hardware, in some examples the decoding function can also be performed using firmware or software.

Figure 9A:
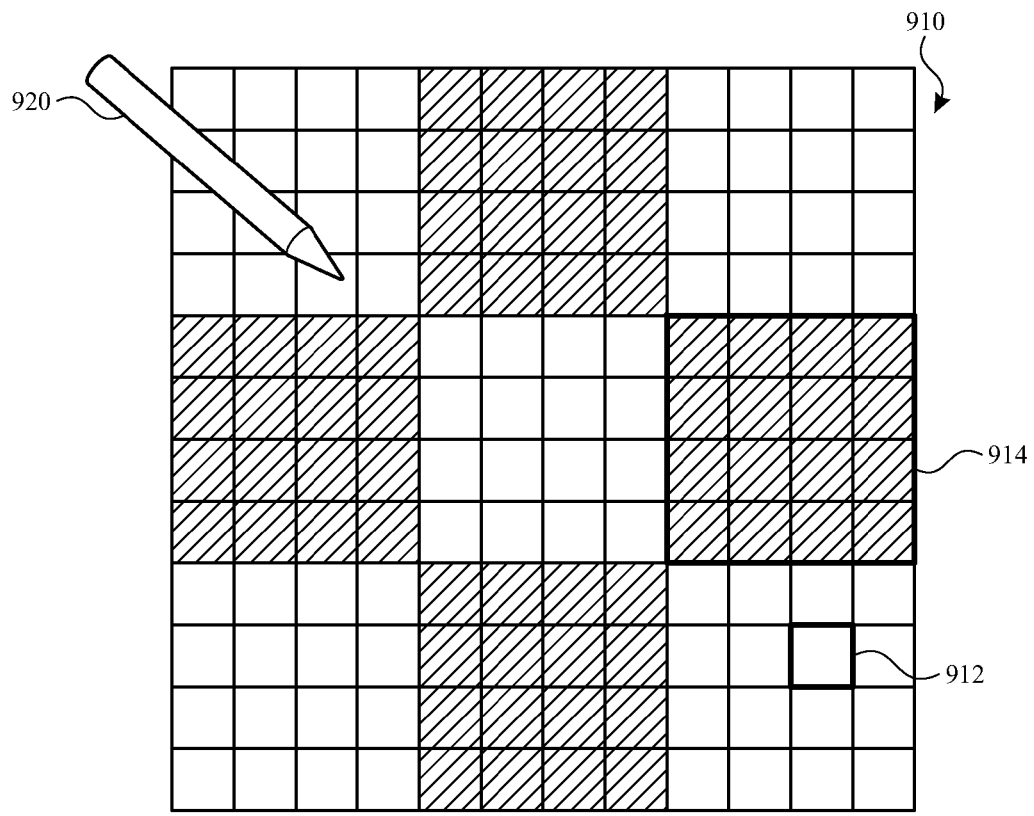
FIGS. 9A-9C illustrate exemplary coarse stylus sub-scans according to examples of the disclosure.
Figure 9B:
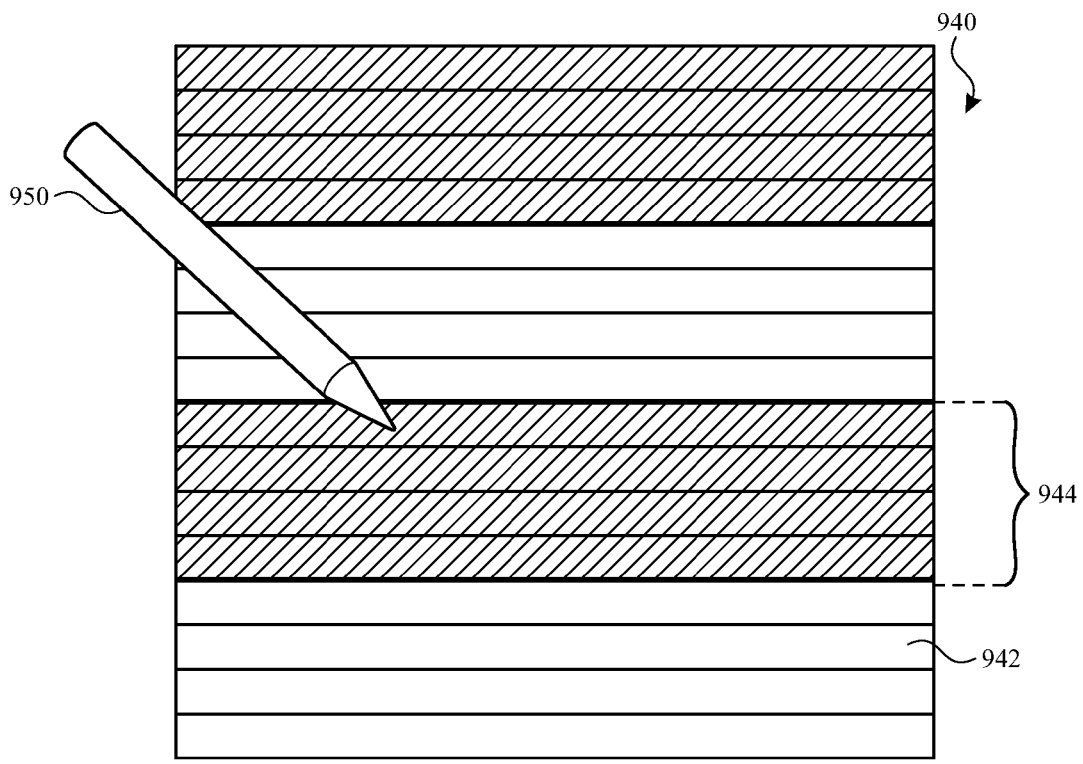
Figure 9C:
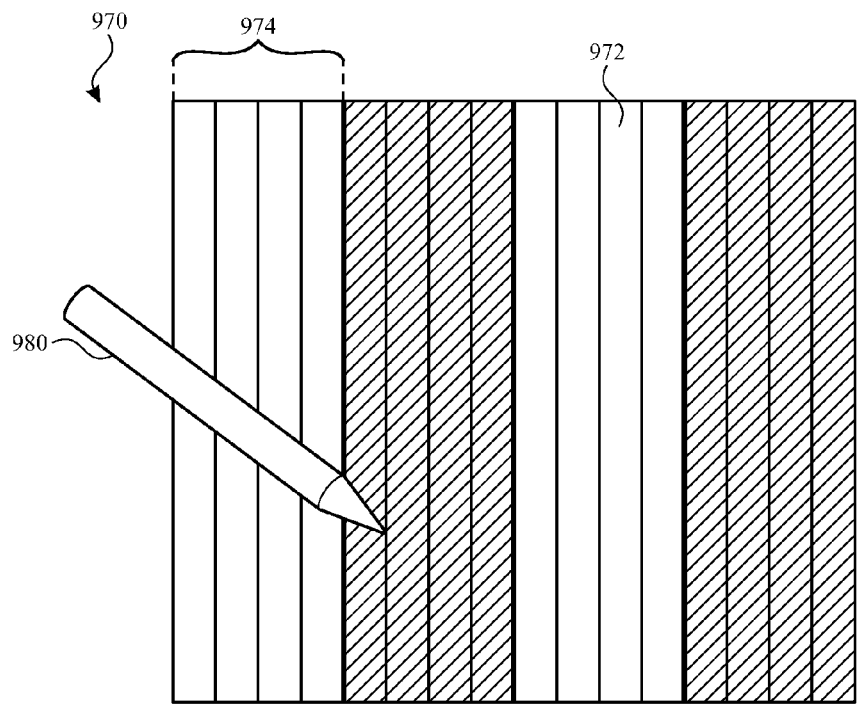

In some examples, a host device can perform a stylus scan including multiple sub-scans to locate a stylus and receive data encoded in the stylus' stimulation signal. During one or more coarse stylus sub-scans, the host device can determine a coarse image of stylus touch for the touch panel and determine a coarse location of the panel at which the stylus can be located. FIGS. 9A-9C illustrate exemplary coarse stylus sub-scans according to examples of the disclosure. In FIG. 9A, an exemplary touch sensing system can perform a coarse stylus sub-scan of an array of pixelated touch sensors (e.g., sensor 912) forming touch sensor panel 910 to determine an approximate location of stylus 920. In some examples, the touch sensing system can couple multiple pixelated touch sensors (e.g., touch sensors 912) of touch sensor panel 910 into larger groups (e.g., region 914) to be scanned by sense channels, for example. During a coarse stylus sub-scan, the touch sensing system can determine a coarse location of stylus 920 to be within one of the groups of sensors (e.g., a region of touch sensor panel 910), for example. Once the stylus 920 is coarsely located, the touch sensing system can perform a fine stylus sub-scan to determine stylus location with more particularity and/or to receive encoded data, for example.

In some examples, data encoded in a stylus signal can be detected by a touch sensor panel including touch sensors arranged in intersecting rows and columns. FIG. 9B illustrates an exemplary touch sensing system performing a coarse stylus sub-scan in a first dimension of touch sensor panel 940, for example. In FIG. 9B, touch sensors disposed in rows can be sensed, and therefore the sub-scan can also be referred to as a coarse stylus row sub-scan. In some examples, touch sensor panel 940 can receive stimulation signals from active stylus 950. During a coarse stylus row sub-scan, touch sensor panel 940 can couple a plurality of touch sensors (e.g., sensor 942) disposed in rows into groups (e.g., group 944) to be sensed by sense channels, for example. In some examples, the coarse stylus row sub-scan can include sampling a self-capacitance of one or more touch sensor groups included in touch sensor panel 940 to determine a coarse location of active stylus 950 in one sensor group, for example. Once the stylus 950 is located coarsely in one dimension (along the rows), the touch sensing system can perform a fine stylus sub-scan in one dimension (or fine stylus row sub-scan) to determine stylus location with more particularity and to receive encoded data, for example. In some examples, a fine stylus row sub-scan can include sampling a self-capacitance of touch sensors arranged in rows individually or in smaller groups than scanned during the coarse stylus row sub-scan. In some examples, a fine stylus row sub-scan can include sampling a self-capacitance of touch sensors in the identified group of touch sensors proximate to the stylus 950. In either example, the fine stylus row sub-scan can include sampling and decoding data from the touch sensors in the identified group. By decoding data from a subset of touch sensors proximate to active stylus 950, a small number of decoder channels can be provided while also preserving signal integrity and signal to noise ratio (SNR). Methods and hardware for sampling and decoding encoded stylus data will be described.

FIG. 9C illustrates an exemplary touch sensor panel 970 performing a coarse detection scan in a second dimension, for example. In FIG. 9C, touch sensors disposed in columns can be sensed, and therefore the sub-scan can also be referred to as a coarse stylus column sub-scan. In some examples, touch sensor panel 970 can receive stimulation signals from active stylus 980. During a coarse stylus column sub-scan, touch sensor panel 970 can couple a plurality of touch sensors (e.g., sensor 972) disposed in columns into groups (e.g., group 974) to be sensed by sense channels, for example. In some examples, the coarse stylus column sub-scan can include sampling a self-capacitance of one or more touch sensor groups included in touch sensor panel 970 to determine a coarse location of active stylus 980 in one sensor group, for example. Once the stylus 980 is located coarsely in one dimension (along the columns), the touch sensing system can perform a fine stylus sub-scan in one dimension (or fine stylus column sub-scan) to determine stylus location with more particularity and to receive encoded data, for example. In some examples, a fine stylus column sub-scan can include sampling a self-capacitance of touch sensors arranged in rows individually or in smaller groups than scanned during the coarse stylus column sub-scan. In some examples, a fine stylus column sub-scan can include sampling a self-capacitance of touch sensors in the identified group of touch sensors proximate to the stylus 980. In either example, the fine stylus column sub-scan can include sampling and decoding data from the touch sensors in the identified group. By decoding data from a subset of touch sensors proximate to active stylus 980, a small number of decoder channels can be provided while also preserving signal integrity and improving a signal to noise ratio (SNR). Methods and hardware for analyzing encoded stylus data will be described.

Figure 10:
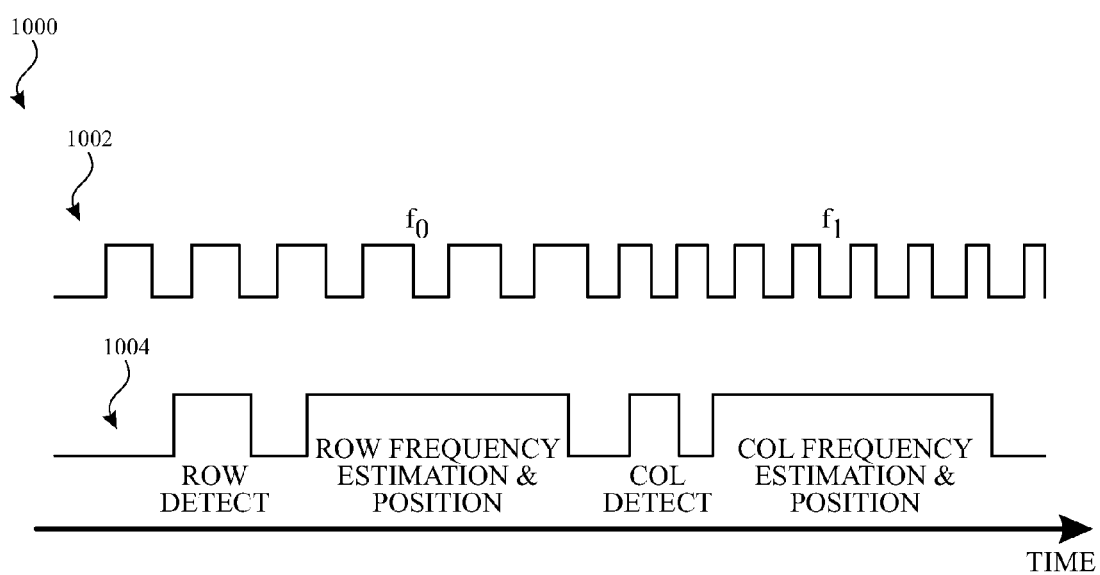
FIG. 10 illustrates an example timing diagram for stylus activity and touch sensor panel activity, according to examples of the disclosure.

To continue to track the location of a powered stylus and collect encoded data from a stylus signal at one or more touch sensors proximate to the stylus tip, a touch sensor panel can perform a sequence of the above described stylus sub-scans, for example. FIG. 10 illustrates an example timing diagram 1000 for stylus activity 1002 and touch sensor panel activity 1004, according to examples of the disclosure. In some examples, an active stylus can use frequency modulation to transmit encoded data to a host device. Stylus signal 1002 includes a transmission at a first frequency f0 and a transmission at a second frequency f1, for example. In some examples, two frequencies can be used to transmit data in a binary code. In some examples, a stylus signal 1002 can include more than two different frequencies to encode data.

A touch sensing system (e.g., touch controller) can perform various types of stylus sub-scans according to timing 1004, for example. In some examples, one or more coarse detection sub-scans, such as a coarse stylus row sub-scan ("ROW DETECT") or coarse stylus column sub-scan ("COLUMN DETECT") can be used to coarsely detect stylus location along one or both axes. In some examples, one or more fine detection sub-scans, such as fine stylus row sub-scan ("ROW FREQ. ESTIMATION & POSITION") and fine stylus column sub-scan ("COL FREQ. ESTIMATION AND POSITION") can be performed to finely track stylus location and to decode stylus signals at sensors proximate to the determined stylus location. In some examples, a coarse stylus location along a group of rows can be detected during "ROW DETECT". Once the stylus is coarsely located, a plurality of sensors proximate to the stylus (e.g., those within the group and/or proximate to the group) can be sampled for further analysis during "ROW FREQ. ESTIMATION & POSITION," for example, to determine a fine location of the stylus along the rows and/or decode data encoded in the stylus stimulation signals. A coarse stylus location along a group of columns can be similarly detected during "COL DETECT," and selected columns (e.g., those within the group and/or proximate to the group) can similarly be sampled during "COL FREQ. ESTIMATION & POSITION," for example, to determine a fine location of the stylus along the columns and/or decode data encoded in the stylus stimulation signals. In some examples related to a touch sensor panel including a pixelated array of touch sensors, a two-dimensional coarse stylus sub-scan can be performed to determine a coarse location of the stylus followed by a fine stylus sub-scan to determine a fine location of the stylus and/or decode data encoded in the stylus stimulation signals.

It should be understood that the sequence of stylus sub-scans in FIG. 10 is exemplary. In some examples, COL DETECT followed by COL FREQ. ESTIMATION & POSITION can be performed before ROW DETECT and ROW FREQ. ESTIMATION & POSITION. In some examples, ROW DETECT and COL DETECT can be performed followed by ROW FREQ. ESTIMATION & POSITION and COL FREQ. ESTIMATION & POSITION. In some examples, encoded data can be transmitted/decoded during only one ROW FREQ. ESTIMATION & POSITION or COL FREQ. ESTIMATION & POSITION. In other examples, as described above, encoded data can be transmitted/decoded during each of the ROW FREQ. ESTIMA- TION & POSITION and COL FREQ. ESTIMATION & POSITION. In some examples, one or more fine stylus sub-scans, such as COL FREQ. ESTIMATION & POSITION and/or ROW FREQ. ESTIMATION & POSITION, can be repeated without interleaving a coarse scan, such as ROW DETECT and/or COL DETECT, in between.

The sequence of stylus sub-scans (e.g., as illustrated in FIG. 10) can be performed continuously (e.g., once per stylus sensing frame). In some examples, the sequence of stylus sub-scans can be performed periodically (e.g., every N sensing frames, once per second, etc.). In some examples, when a coarse stylus sub-scan fails to detect a stylus, the fine stylus sub-scans can be aborted. Analysis of collected stylus data will be described below.

In some examples, a touch sensing system can perform additional scans interleaved with the stylus sub-scans described above. In some examples, a touch sensing system can perform touch detection scans for detecting a touch or hover of a finger or other conductive object. Unlike a powered stylus, a finger or other conductive object may not produce a stimulation signal to be coupled to one or more touch sensors included in a touch sensor panel. Therefore, in some examples, the one or more touch detection scans can include applying a stimulation signal to sense a mutual or self-capacitance of one or more touch sensors. Touch scans can include a coarse touch detection scan and a fine touch detection scan to determine a coarse and fine location of a conductive object, for example. In some examples, the coarse and fine touch scans can include coupling one or more touch sensors to a stimulation signal.

In some examples, a fine stylus scan can be any stylus scan that provides information about stylus touch events with a higher resolution than a given corresponding coarse stylus scan (i.e., a fine stylus row sub-scan can be higher resolution than a corresponding coarse stylus row sub-scan, and a fine stylus column sub-scan can be a higher resolution than a corresponding coarse stylus column sub-scan). As described herein, resolution of a scan can be understood in terms of the number of capacitive measurements representing a corresponding group of electrodes of a touch sensor panel. For example, self-capacitance for a 4×4 array of touch nodes (16 touch nodes) can be represented by 16 self-capacitance measurements (e.g., one self-capacitance measurement for each node measured by a sense channel), 4 self-capacitance measurements (e.g., one self-capacitance measurement for groups four nodes each measured by a sense channel), or a single self-capacitance measurement (e.g., one self-capacitance measurement for a group of all the nodes coupled to a single sense channel). These numbers of measurements are only exemplary, but it is understood that 16 self-capacitance measurements for 16 touch nodes can provide higher resolution (finer detail) than 4 measurements or a single measurement, respectively. Likewise, mutual capacitance for a 4×4 array of touch nodes (16 touch nodes) can be represented by 16 mutual capacitance measurements (e.g., four mutual capacitance measurements for each group of 4 electrodes, with each electrode in the group acting as a sense electrode), 8 mutual capacitance measurements (e.g., two mutual capacitance measurements for each group of 4 electrodes, with two of the electrodes in the group acting as a sense electrode), 4 mutual capacitance measurements (e.g., one mutual capacitance measurement for each group of 4 electrodes, with one electrode in the group acting as a sense electrode), or a single mutual capacitance measurement (e.g., one mutual capacitance measurement for all 16 electrodes, with a group of electrodes acting as a sense electrode coupled to one sense channel). These numbers of measurements are only exemplary, but it is understood that 16 mutual capacitance measurements for 16 touch nodes can provide higher resolution (finer detail) than 4 measurements or a single measurement, respectively.

Figures 11A, 11B:
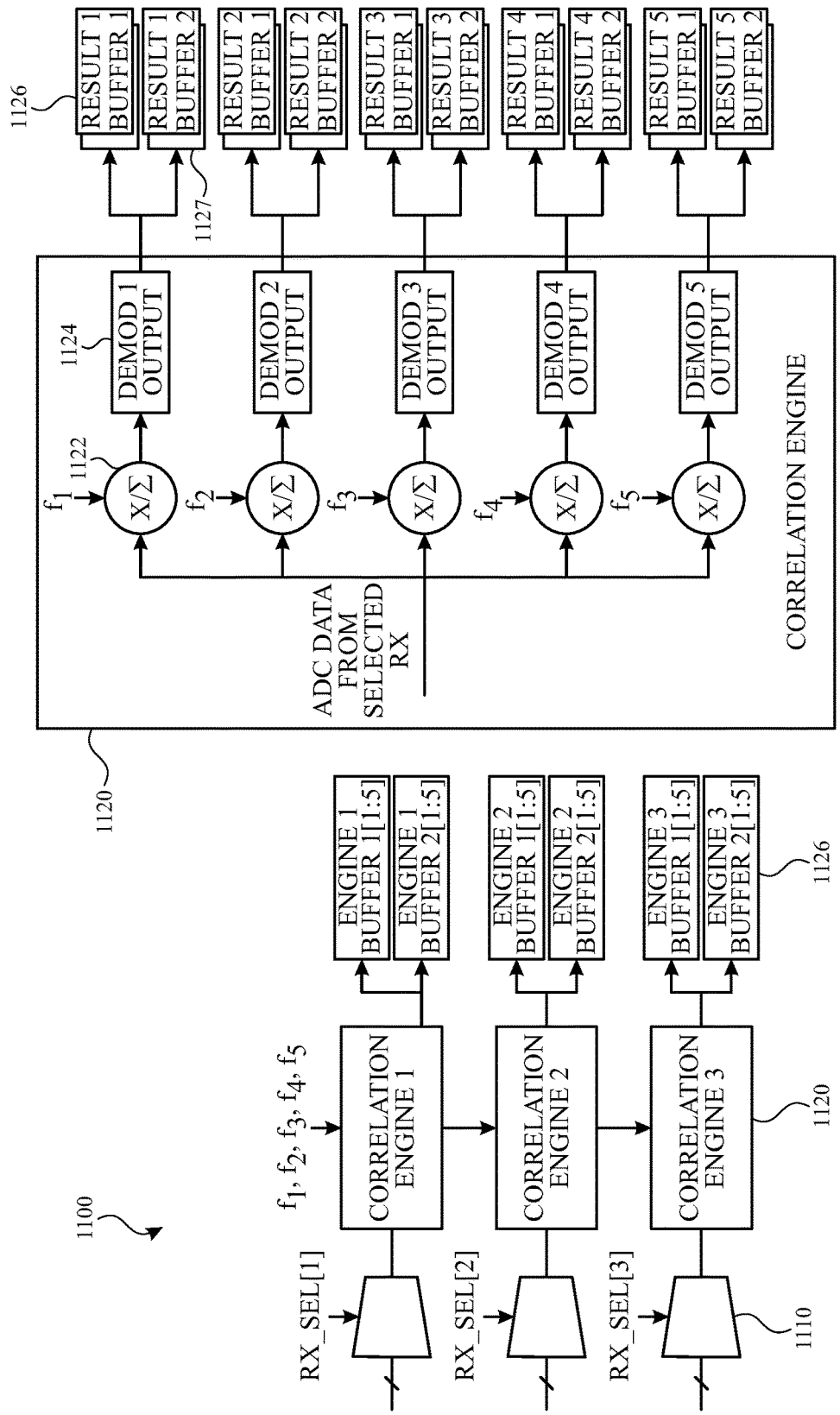
FIGS. 11A-11B illustrate exemplary stylus signal analysis hardware according to examples of the disclosure.

In some examples, a touch sensitive device can include circuitry for analyzing encoded stylus data. In some examples, analysis can be performed using hardware, software, or firmware. FIG. 11A illustrates exemplary stylus signal analysis hardware 1100 for decoding stylus data according to examples of the disclosure. Stylus signal analysis hardware 1100 can be used to analyze collected data from one or more touch sensors proximate to a stylus during a fine stylus sub-scan, as described above, for example. In some examples, once stylus location is coarsely determined, proximate touch sensors (or sense channels measuring proximate touch sensors) can be selected at multiplexers 1110, for example. During a fine stylus sub-scan, stylus location can be more finely resolved and a subset of sensors proximate to the stylus (e.g., as determined by the coarse stylus sub-scan) can be selected to sample encoded data. In some examples, coarsely and finely resolving stylus location can include generating an "image of touch" representative of stylus presence at the touch sensor panel. In some examples, selecting one or more touch sensors using multiplexers 1110 based on an image of touch can be advantageous over receiving stylus data at all touch sensors on a panel, as described above. For example, providing a dedicated decoding channel for receiving and decoding stylus data for each sense channel can be expensive from a hardware perspective (cost, power, area, etc.). Instead, fewer decoding channels can be used, and the touch sensors (or sense channels) to sample for decoding stylus data can be intelligently selected using multiplexers 1110. Fewer decoding channels can reduce hardware requirements (reducing cost, power, and area) and meet SNR requirements for the decoding channels, for example.

In examples where a powered stylus encodes data using frequency modulation, a spectrum can be determined for received data at correlation engines 1120. FIG. 11B illustrates an exemplary correlation engine 1120 in detail according to examples of the disclosure. In some examples, correlation engines 1120 can include a plurality of demodulators 1122, and each demodulator can be configured to demodulate a received signal at a selected frequency. In some examples, multiple frequencies, such as f1-f5 illustrated in FIGS. 11A-11B, can be selected corresponding to a range of frequencies the stylus can use to encode data. It should be understood that a fewer or more frequencies can be provided to encode data. Although correlation engine 1120 is illustrated including demodulators 1122 to demodulate frequency-encoded data, other hardware can be included to process a stylus signal including data encoded in a different way. For example, demodulators 1122 can be provided with a plurality of signals with different phases to determine a phase of a received signal including phase-encoded data. In some examples, a plurality of comparators can be provided, each one coupled to a signal with a different amplitude to determine an amplitude of a received signal including amplitude-encoded data. The results 1124 of each of the demodulators 1122 can be stored in buffers 1126 and 1127 to capture and analyze several frames of data, for example. In some examples, demodulating a received signal with multiple demodulators across a range of frequencies can determine a frequency spectrum of a stylus stimulation signal. By determining and storing transmitted frequencies, frequency-encoded stylus data can be decoded.

Figure 12:
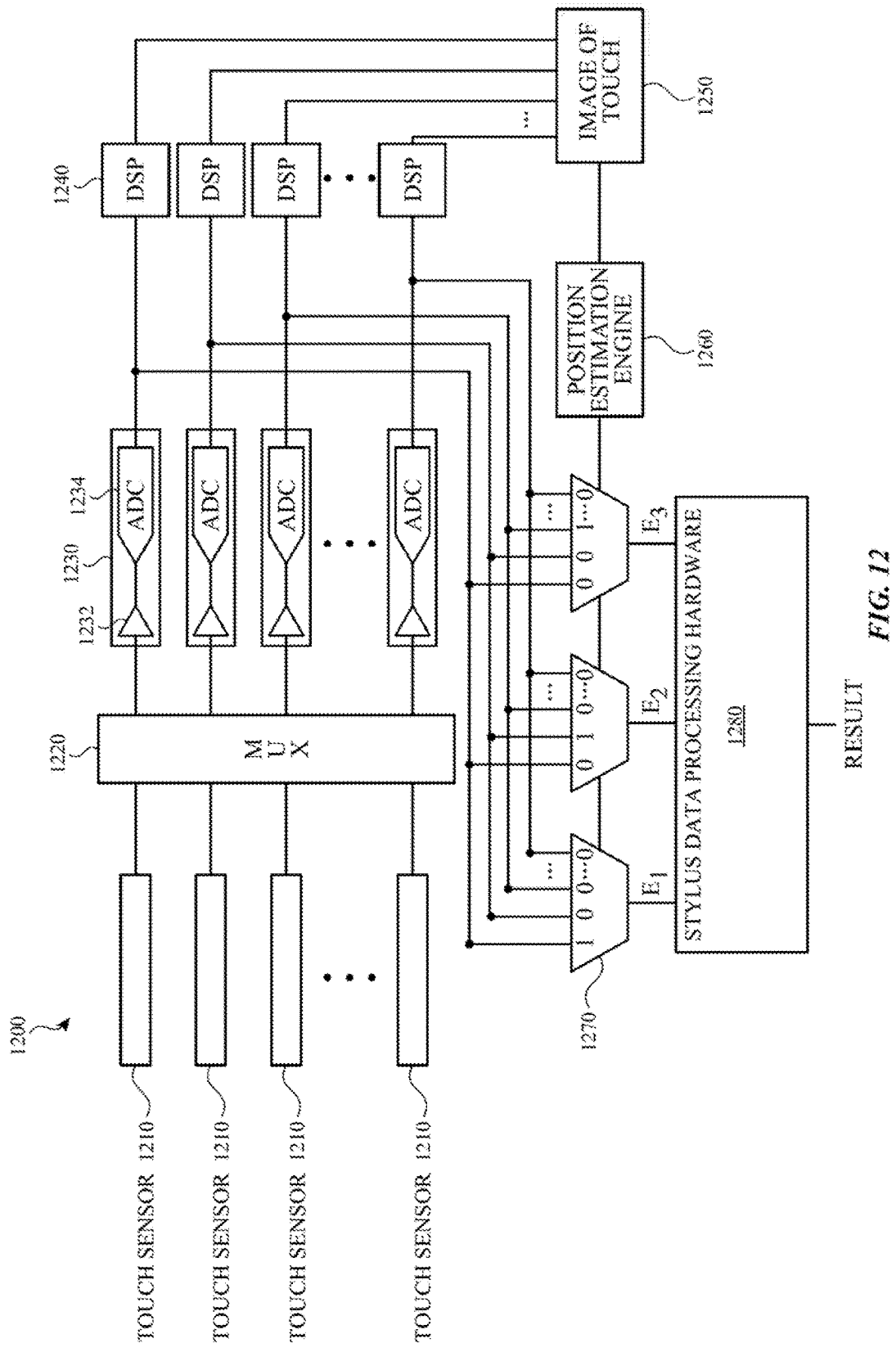
FIG. 12 illustrates an example block diagram of a touch sensing system including position-based data decoding according to examples of the disclosure.

FIG. 12 illustrates an example block diagram of a touch sensing system including position-based data decoding according to examples of the disclosure. The elements of system 1200 can be included, for example, as part of the touch ASIC 201. In some examples, a stimulation signal can be captured at touch sensors 1210 incorporated into a touch-sensitive display. Touch sensors 1210 can be arranged in intersecting rows and columns, as described with reference to FIGS. 3, 6 and 9B-9C for example. Alternatively, in some examples, touch sensors 1210 can be arranged in a pixelated array, as described with reference to FIGS. 4, 7 and 9A, for example. In some examples, a coarse stylus sub-scan can sample subsets of the touch sensors 1210 in multiple steps using multiplexer 1220. Collected data can be processed by sense channels 1230, for example. In some examples, each sense channel can include an amplifier 1232 and an analog-to-digital converter (ADC) 1234. In some examples, other components can be included in sense channels 1230 (e.g., anti-aliasing filters). Sense channels 1230 can be implemented using hardware, software, firmware, or a combination thereof. The outputs of sense channels 1230 can be processed by digital signal processing units (DSPs) 1240, for example. DSPs 1240 can perform operations such as filtering and determining changes in capacitance at each touch sensor 1210, for example. To determine changes in capacitance at the touch sensors 1210, DSPs 1240 can include demodulators (not shown). The demodulators can perform digital demodulation on the output of the ADCs. The demodulators can also include a programmable or non-programmable delay to align the phase of the ADC output with the demodulation waveform, a mixer (e.g., signal multiplier) to mix the ADC output with the demodulation waveform, and an accumulator (e.g., an integrator) to accumulate the output from mixer. Although not shown, the accumulated output from the integrator can be scaled, decoded (e.g., in multi-stim touch sensing schemes) to generate result which can be stored in a memory (e.g., RAM 212) for further processing.

In some examples, the outputs from the DSPs 1240, taken together, can be viewed as an "image of touch" 1250, indicative of which location(s) on the panel a stylus (and/or finger) is touching. Based on an image of touch 1250, a position estimation engine 1260 can select one or more touch sensors 1210 (or sense channels 1230) proximate to the stylus, in some examples. Position estimation engine 1260 can be a dedicated processor or other hardware component or software or firmware executed by a multi-purpose processor, such as touch processor(s) 202, for example. In some examples, position estimation engine 1260 can be a combination of firmware or software and hardware or a state machine. In some examples, the position estimation engine 1260 can select one or more touch sensors 1210 (or sense channels 1230) to use for stylus data sampling. The output of the selected one or more sensors can be coupled to multiplexers 1270 for further processing and decoding. In some examples, data collection at sense channels 1230 is not limited to sampling the selected one or more sensors. Touch and/or stylus location scanning can continue for all or part of the panel while selected sense channels are additionally sampled to decode stylus data, for example. Signals selected by multiplexers 1270 can further be analyzed by stylus data processing hardware 1280 to decode data encoded in a stylus stimulation signal, for example. In some examples, each multiplexer of the plurality of multiplexers 1270 can be routed to all ADC outputs to select one sense channel among all sense channels on the panel. In some examples where a plurality of channels are selected to be analyzed at the same time, the multiplexers 1270 may be wired using fewer connections. For example, if the system analyzes data from three sense channels in parallel, each multiplexer 1270 may select one sense channel of one third of all sense channels incorporated into the panel, as no two multiplexers 1270 would need to simultaneously select the same channel. Dividing the available sense channels into groups such that each sense channel can only be selected by a subset of the plurality of multiplexers 1270 can reduce the number of connections needed between the ADC outputs and the multiplexers. In some examples, stylus data processing hardware 1280 can include one or more correlation engines 1120 for determining a frequency spectrum of a received signal. In some examples, one or more of position estimation engine 1260, multiplexers 1270, and stylus data processing hardware 1280 can reside on a dedicated hardware device that can be coupled to an existing touch-sensing system.

Figure 13A:
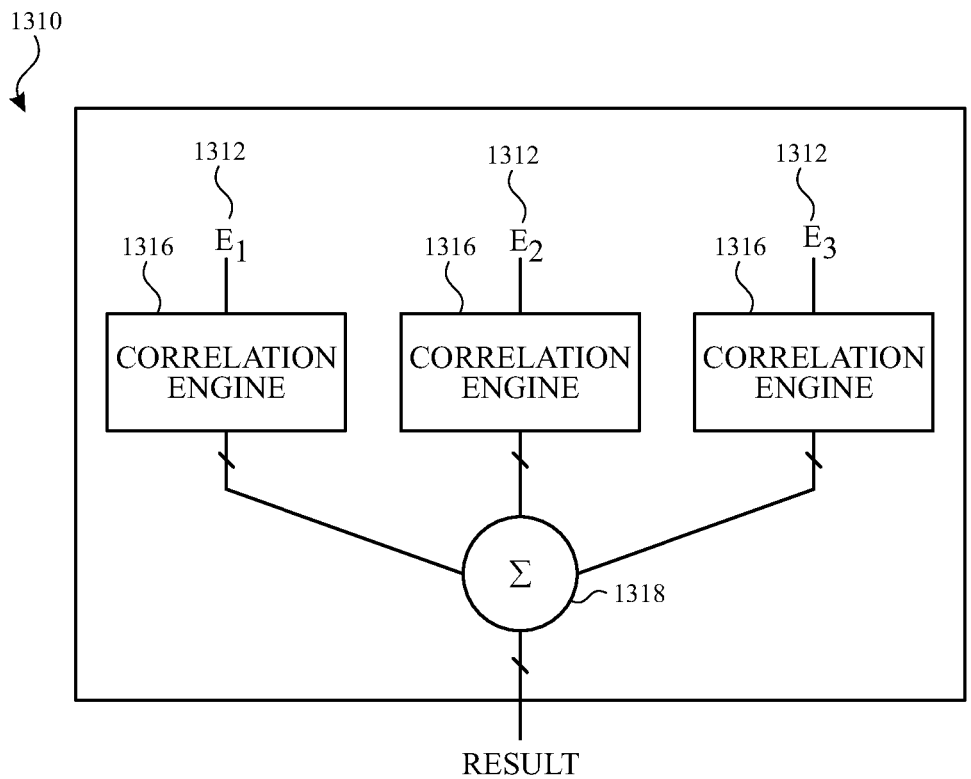
FIGS. 13A-13B illustrate exemplary stylus data processing hardware according to examples of the disclosure.
Figure 13B:
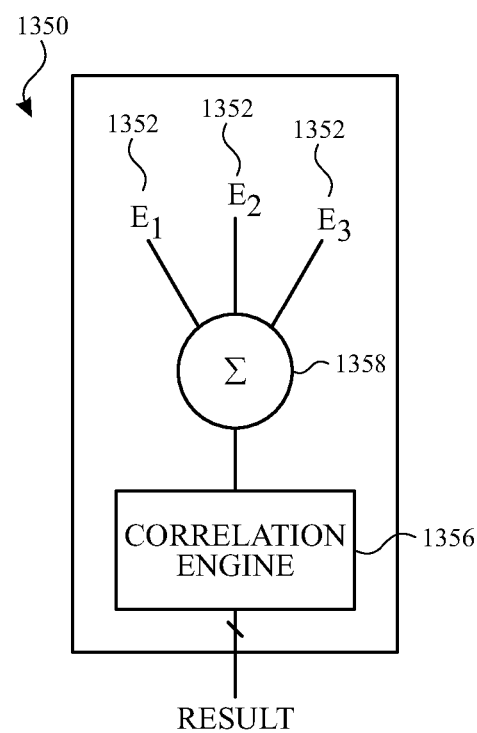

In some examples, a dedicated hardware block can be provided to analyze data encoded in a stylus stimulation signal, such as stylus data processing hardware 1280. Using hardware to process the stylus data can reduce latency between a user action (e.g., applying force, toggling a button or switch, etc.) and a response by the host device associated with the action, for example. In some examples, however, software or firmware can be used to analyze stylus stimulation signals. FIGS. 13A-13B illustrate exemplary stylus data processing hardware 1310 and 1350 according to examples of the disclosure. In some examples, stylus data processing hardware 1310 can receive input 1312 selected by position estimation engine 1260 via multiplexers 1270. FIG. 13A illustrates an example stylus data processing hardware unit 1310 including a plurality of correlation engines 1316 according to examples of the disclosure. In some examples, each channel of data can be input to a separate correlation engine 1316. Correlation engines 1316 can be hardware components similar to correlation engine 1120 and/or implemented in software or firmware (e.g., executed by touch processor 202). The resulting frequency spectrums from correlation engines 1316 can be input to adder 1318 to determine an estimated frequency of a stylus stimulation signal. It should be understood that adder 1318 is merely one example of a function used to combine the frequency spectrums from the correlation engines 1316. In some examples, a median, a maximum SNR, a maximum peak signal, or other function may be computed to select the data to be decoded. The stylus stimulation frequency can be used to decode data encoded by the stylus, for example. FIG. 13B illustrates an example stylus data processing hardware unit 1350 that can sum selected signals 1352 before determining a spectrum with correlation engine 1356. Selected signals 1352 may be provided by a position estimation engine 1260 via multiplexers 1270, for example. In some examples, correlation engine 1356 may be implemented using hardware similar to correlation engine 1120 and/or implemented using software or firmware (e.g., executed by touch processor 202). By summing input signals 1352 before performing spectral analysis with correlation engine 1356, fewer correlation engines can be included in stylus data processing hardware 1350 thereby reducing hardware requirements (area, power, cost), for example. Stylus processing hardware 1310, however, can have an improved SNR compared with stylus processing hardware 1350 because correlation is performed before summing, whereas stylus processing hardware 1350 sums the noise from the inputs first before correlation. As a result, a plurality of correlation engines 1316 can reduce frequency content resulting from noise, for example.

In some examples, a combination of stylus processing hardware 1310 and stylus processing hardware 1350 can be used. For example, stylus data from multiple groups of selected touch sensors can be summed and then analyzed with one or more correlation engines. For example, nine touch sensors (or sense channels) proximate to the stylus can be selected and coupled into three groups of three sensors prior to demodulation. In this example, the three frequency spectra (each indicative of a sum of data from three touch sensors) can be summed by an additional adder and then decoded. A multi-staged stylus processing hardware device can produce a tradeoff between SNR and cost, for example.

Figure 14:
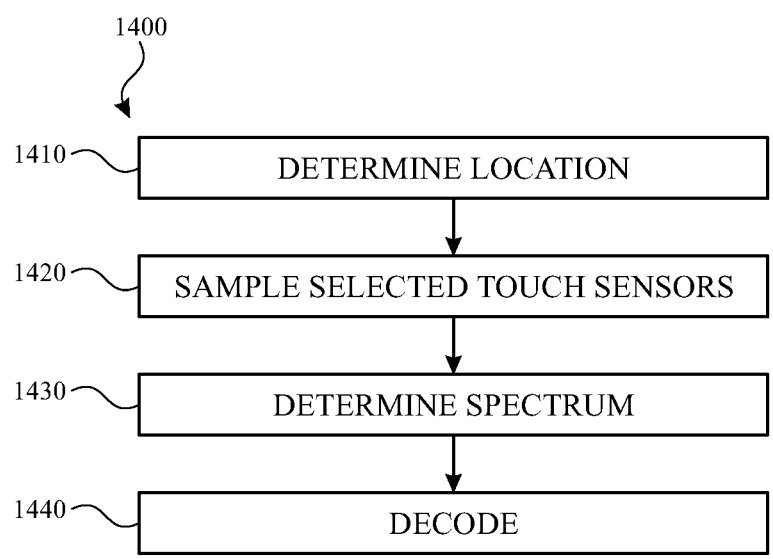
FIG. 14 illustrates an example process for decoding data included in a stylus stimulation signal according to examples of the disclosure.

FIG. 14 illustrates an example process 1400 for decoding data included in a stylus stimulation signal according to examples of the disclosure. Process 1400 can be performed by a touch sensing system (e.g., by touch ASIC 201). In some examples, process 1400 can include determining a location of a stylus or other input device (e.g., stylus 500, 920 or 960). For example, the touch sensing system can perform one or more coarse detection scans, such as ROW DETECT and/or COL DETECT described with reference to FIG. 10 to determine a stylus location. In examples including an array of pixelated touch sensors, such as the examples shown in FIGS. 4, 7 and 9A, a coarse detection scan can also be performed to coarsely determine stylus location. The coarse location can be used to select touch sensors (or sense channels) to sample to decode stylus data. In some examples, a position estimation engine 1260 can output one or more signals to one or more multiplexers 1270 to select the one or more touch sensors (or sense channels) proximate to the stylus for sampling. At 1420, the touch sensing system can perform a fine scan to determine a fine stylus location and decode stylus data. The stylus data can be sampled from the selected touch sensors (or sense channels) selected based on the coarse location. At 1430, the selected signals from the selected touch sensors (or sense channels) can be analyzed (e.g., using stylus data analysis hardware 1280, 1310 or 1350). Additionally, the signals received from the sense channels can also be processed by the touch sensing system to determine the location of the stylus. In some examples, firmware or software (e.g., executed by processor 202) can be used for the stylus data analysis. In some examples, the data can be analyzed using one or more correlation engines 1120 including a plurality of demodulators 1122. The resulting demodulation 1124 can be used to determine a frequency spectrum of a stylus signal, for example. In some examples, the spectral analysis of the stylus data analysis hardware can be implemented in software or firmware to be executed by one or more processors (e.g., touch processor 202). For example, a frequency spectrum can be determined algorithmically (e.g., using FFT or one or more other known algorithms). In some examples, other data processing can be performed to decode data encoded in other ways. For example, an amplitude of a stylus signal can be determined before decoding amplitude-encoded data. In some examples, a phase of a stylus signal can be determined before decoding phase-encoded data. In general, many possible signal processing techniques to extract the desired information could be devised to decode data encoded in phase, frequency, amplitude, position, pulse width, waveform cross-section, spread-spectrum signature, etc. At 1440, stylus data can be decoded. For example, a frequency of a stylus stimulation signal can be determined to decode frequency-modulated data. In some examples, other methods of decoding/encoding are possible. For example, a stylus may use phase modulation, amplitude modulation, or another encoding scheme. In some examples, after decoding stylus data, data from the selected touch sensors can be used to re-estimate stylus location for a next stylus scan. In some examples, a new coarse detection scan can be performed to determine stylus location for the next stylus scan. Process 1400 can be repeated while a stylus is detected at a host device.

Therefore, according to the above, some examples of the disclosure are directed to a touch-sensitive device. The touch-sensitive device can comprise a plurality of sense channels configured to receive signals from an input device at a plurality of touch sensors; a plurality of digital signal processors coupled to outputs of the plurality of sense channels, the plurality of digital signal processors including a plurality of first demodulators configured to demodulate the received signals; a position estimation processor configured to estimate a location of the input device based on a first plurality of received signals processed by the plurality of digital signal processors, and configured to select a subset of the plurality of sense channels coupled to one or more touch sensors proximate to the input device based on the estimated location of the input device; and one or more correlators couplable to the selected subset of the plurality of sense channels. The one or more correlators can comprise a plurality of second demodulators. The second demodulators can be configured to demodulate a second plurality of received signals from the selected subset of the plurality of sense channels. The one or more correlators can be configured to determine frequency content of the demodulated signals. Additionally or alternatively to one or more of the examples disclosed above, in some examples, the touch-sensitive device can further comprise one or more multiplexers configured to receive a signal indicative of the selected subset of the plurality of sense channels from the position estimation processor and couple the selected subset of the plurality of sense channels to the one or more correlators. Additionally or alternatively to one or more of the examples disclosed above, in some examples, a correlator of the plurality of correlators can further comprise an adder coupled to a plurality of outputs of the second demodulators, and the correlator can be configured to determine the frequency content of an output of the adder. Additionally or alternatively to one or more of the examples disclosed above, in some examples, the first plurality of received signals can be received while the touch-sensitive device is configured in a first configuration, the first configuration including coupling two or more touch sensors of the plurality of touch sensors to each sense channel. Additionally or alternatively to one or more of the examples disclosed above, in some examples, the second plurality of received signals can be received while the touch-sensitive device is configured in a second configuration, the second configuration including coupling one touch sensor of the plurality of touch sensors to each sense channel.

Other examples of the disclosure are directed to a method for decoding data transmitted by an input device. The method can comprise: receiving signals from the input device; estimating a location of the input device relative to a touch sensitive surface based on a first plurality of received signals; selecting one or more sense channels coupled to the touch sensitive surface based on the estimated location of the input device, the one or more selected sense channels sensing touch sensors of the touch sensitive surface proximate to the input device; and decoding encoded data from a second plurality of signals received at the selected one or more sense channels. Additionally or alternatively to one or more of the examples disclosed above, in some examples, the method can further comprise demodulating the second plurality of signals with a plurality of demodulators. Additionally or alternatively to one or more of the examples disclosed above, in some examples, the method can further comprise determining frequency content of the demodulated second plurality of signals. Additionally or alternatively to one or more of the examples disclosed above, in some examples, the method can further comprise determining one of a sum, a median, a maximum peak, and a maximum signal-to-noise ratio of the demodulated second plurality of signals. Additionally or alternatively to one or more of the examples disclosed above, in some examples, the method can further comprise receiving the first plurality of received signals during a first operation, the first operation comprising coupling two or more touch sensors of the touch sensitive surface to each sense channel. Additionally or alternatively to one or more of the examples disclosed above, in some examples, the method can further comprise receiving the second plurality of received signals during a second operation, the second operation comprising coupling one touch sensor of the touch sensitive surface to each sense channel.

Some examples of the disclosure are directed to a non-transitory computer readable storage medium. The computer readable medium can store one or more programs, the one or more programs comprising instructions, which when executed by an electronic device including one or more processors, can cause the electronic device to perform a method. The method can comprise receiving signals from an input device; estimating a location of the input device relative to a touch sensitive surface based on a first plurality of received signals; selecting one or more sense channels coupled to the touch sensitive surface based on the estimated location of the input device, the one or more selected sense channels sensing touch sensors of the touch sensitive surface proximate to the input device; and decoding encoded data from a second plurality of signals received at the selected one or more sense channels. Additionally or alternatively to one or more of the examples disclosed above, in some examples, the method can further comprise demodulating the second plurality of signals with a plurality of demodulators. Additionally or alternatively to one or more of the examples disclosed above, in some examples, the method can further comprise determining frequency content of the demodulated second plurality of signals. Additionally or alternatively to one or more of the examples disclosed above, in some examples, the method can further comprise determining one or more of a sum, a median, a maximum peak, and a maximum signal-to-noise ratio of the demodulated second plurality of signals. Additionally or alternatively to one or more of the examples disclosed above, in some examples, the method can further comprise receiving the first plurality of received signals during a first operation, the first operation comprising coupling two or more touch sensors of the touch sensitive surface to each sense channel. Additionally or alternatively to one or more of the examples disclosed above, in some examples, the method can further comprise receiving the second plurality of received signals during a second operation, the second operation comprising coupling one touch sensor of the touch sensitive surface to each sense channel.

Some examples of the disclosure are directed to an apparatus. The apparatus can comprise a position estimation processor configured to estimate a location of the input device based on a first plurality of signals received at a plurality of sense channels, and configured to select a subset of the plurality of sense channels coupled to one or more touch sensors proximate to the input device based on the estimated location of the input device; and one or more correlators couplable to the selected subset of the plurality of sense channels. The one or more correlators can comprise a plurality of demodulators. The demodulators can be configured to demodulate a second plurality of signals from the selected subset of the plurality of sense channel. The one or more correlators can be configured to determine frequency content of the demodulated signals. Additionally or alternatively to one or more of the examples disclosed above, in some examples, the apparatus can further comprise one or more multiplexers coupled to one or more inputs of the correlators. The one or more multiplexors can be configured to: receive a signal indicative of the selected subset of the plurality of sense channels from the position estimation processor and couple the selected subset of the plurality of sense channels to the one or more correlators. Additionally or alternatively to one or more of the examples disclosed above, in some examples, a correlator of the plurality of correlators can further comprise an adder coupled to a plurality of outputs of the demodulators. Additionally or alternatively to one or more of the examples disclosed above, in some examples, the first plurality of signals can be received while two or more touch sensors of the plurality of touch sensors are coupled to each sense channel. Additionally or alternatively to one or more of the examples disclosed above, in some examples, the second plurality of signals can be received while one touch sensor of the plurality of touch sensors is coupled to each sense channel.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A touch-sensitive device, comprising:
 a plurality of touch sensors;
 a first multiplexer having one or more inputs, the inputs of the first multiplexer coupled to the plurality of touch sensors;
 a plurality of sense channels configured to receive signals from an input device at the plurality of touch sensors via one or more outputs of the first multiplexer;
 a plurality of digital signal processors coupled to outputs of the plurality of sense channels, wherein the plurality of digital signal processors includes a plurality of first demodulators configured to demodulate the received signals, wherein outputs of the plurality of digital signal processors are indicative of which locations on the touch-sensitive device the input device is touching;
 a position estimation processor coupled to the outputs of the plurality of digital signal processors, the position estimation processor configured to estimate a location of the input device based on a first plurality of received signals from the plurality of sense channels processed by the plurality of digital signal processors, and configured to select a subset of the plurality of sense channels coupled to one or more of the plurality of touch sensors proximate to the input device based on the estimated location of the input device;
 a plurality of correlators couplable to the outputs of the selected subset of the plurality of sense channels, wherein the plurality of correlators each comprise a plurality of second demodulators, the second demodulators configured to demodulate a second plurality of received signals from the selected subset of the plurality of sense channels, the plurality of correlators configured to determine frequency content of the demodulated second plurality of received signals to obtain encoded data from the second plurality of received signals, wherein a number of the plurality of correlators is less than a number of sense channels included in the touch-sensitive device; and
a plurality of second multiplexers, each second multiplexer having an output connected to one of the plurality of correlators and configured to couple one sense channel of the selected subset of sense channels to one of the plurality of correlators to simultaneously couple the selected subset of sense channels to the plurality of correlators.

2. The touch-sensitive device of claim 1, wherein a correlator of the plurality of correlators further comprises an adder coupled to a plurality of outputs of the second demodulators, and the correlator is configured to determine the frequency content of an output of the adder.

3. The touch-sensitive device of claim 1, wherein the first plurality of received signals are received while the touch-sensitive device is configured in a first configuration, the first configuration including coupling two or more touch sensors of the plurality of touch sensors to each sense channel.

4. The touch-sensitive device of claim 1, wherein the second plurality of received signals are received while the touch-sensitive device is configured in a second configuration, the second configuration including coupling one touch sensor of the plurality of touch sensors to each sense channel.

5. The touch-sensitive device of claim 1, further comprising:
a wireless transceiver configured to communicate with a wireless transceiver of the input device, wherein the encoded data comprises pairing information for establishing a connection between the wireless transceiver and the wireless transceiver of the input device.

6. The touch-sensitive device of claim 1, wherein:
the plurality of touch sensors comprise row sensors and column sensors, the row sensors orthogonal to the column sensors,
during a first time period, a plurality of row sensors are coupled, via the selected subset of sense channels, to the plurality of correlators to demodulate first data, and
during a second time period after the first time period, a plurality of column sensors are coupled, via the selected subset of sense channels, to the plurality of correlators to demodulate second data different from the first data.

7. A method implemented by a touch-sensitive device for decoding data transmitted by an input device, the method comprising:
sensing, at a plurality of touch sensors, signals from the input device, wherein the touch sensors are coupled to one or more inputs of a first multiplexer;
receiving, at a plurality of sense channels, a first plurality of signals from the input device via one or more outputs of the first multiplexer;
demodulating, with a plurality of first demodulators included in a plurality of digital signal processors, the received first plurality of signals, wherein outputs of the plurality of digital signal processors are indicative of which locations on the touch-sensitive device the input device is touching;
estimating, with a position estimation processor coupled to the outputs of the plurality of digital signal processors, a location of the input device relative to a touch sensitive surface based on the demodulated signals;
selecting, with the position estimation processor, a subset of the plurality of sense channels coupled to the touch sensitive surface based on the estimated location of the input device, wherein the selected subset of the plurality of sense channels are coupled to one or more of the plurality of touch sensors of the touch sensitive surface proximate to the input device;
simultaneously coupling, via a plurality of second multiplexers, each of the selected subset of the plurality of sense channels to a correlator of a plurality of correlators, each correlator of the plurality of correlators comprising a plurality of second demodulators, wherein a number of the plurality of correlators is less than a number of the plurality of sense channels, wherein each second multiplexer has an output connected to one of the plurality of correlators; and
decoding, with the plurality of correlators, encoded data from a second plurality of signals received at the subset of the plurality of sense channels and demodulated by the plurality of second demodulators by determining frequency content of the demodulated second plurality of received signals.

8. The method of claim 7, further comprising:
receiving the first plurality of received signals during a first operation, the first operation comprising coupling two or more touch sensors of the touch sensitive surface to each sense channel.

9. The method of claim 7, further comprising:
receiving the second plurality of received signals during a second operation, the second operation comprising coupling one touch sensor of the touch sensitive surface to each of the subset of the plurality of sense channels.

10. The method of claim 7, further comprising:
establishing a wireless communication channel between a wireless transceiver and a wireless transceiver included in the input device based on pairing information encoded in the encoded data from the second plurality of signals.

11. The method of claim 7 wherein:
the plurality of touch sensors comprise row sensors and column sensors, the row sensors orthogonal to the column sensors,
during a first time period, a plurality of row sensors are coupled, via the selected subset of sense channels, to the plurality of correlators to demodulate first data, and
during a second time period after the first time period, a plurality of column sensors are coupled, via the selected subset of sense channels, to the plurality of correlators to demodulate second data different from the first data.

12. A non-transitory computer readable storage medium storing one or more programs, the one or more programs comprising instructions, which when executed by an electronic device including one or more processors, causes the electronic device to perform a method comprising:
sensing, at a plurality of touch sensors, signals from an input device, wherein the touch sensors are coupled to one or more inputs of a first multiplexer;
receiving, at a plurality of sense channels, a first plurality of signals from the input device via one or more outputs of the first multiplexer;
demodulating, with a plurality of first demodulators included in a plurality of digital signal processors, the received first plurality of signals, wherein outputs of the plurality of digital signal processors are indicative of which locations on the electronic device the input device is touching;

estimating, with a position estimation processor coupled to the outputs of the plurality of digital signal processors, a location of the input device relative to a touch sensitive surface based on the demodulated signals;

selecting, with the position estimation processor, a subset of the plurality of sense channels coupled to the touch sensitive surface based on the estimated location of the input device, wherein the selected subset of the plurality of sense channels are coupled to one or more of the plurality of touch sensors of the touch sensitive surface proximate to the input device;

simultaneously coupling, via a plurality of second multiplexers, each of the selected subset of the plurality of sense channels to a correlator of a plurality of correlators, each correlator of the plurality of correlators comprising a plurality of second demodulators, wherein a number of the plurality of correlators is less than a number of the plurality of sense channels, wherein each second multiplexer has an output connected to one of the plurality of correlators; and decoding, with the plurality of correlators, encoded data from a second plurality of signals received at the subset of the plurality of sense channels and demodulated by the plurality of second demodulators by determining frequency content of the demodulated second plurality of received signals.

13. The non-transitory computer readable storage medium of claim 12, wherein the method further comprises:
receiving the first plurality of received signals during a first operation, the first operation comprising coupling two or more touch sensors of the touch sensitive surface to each sense channel.

14. The non-transitory computer readable storage medium of claim 12, wherein the method further comprises:
receiving the second plurality of received signals during a second operation, the second operation comprising coupling one touch sensor of the touch sensitive surface to each of the subset of the plurality of sense channels.

15. The non-transitory computer readable storage medium of claim 12, wherein the method further comprises:
establishing a wireless communication channel between a wireless transceiver and a wireless transceiver included in the input device based on pairing information encoded in the encoded data from the second plurality of signals.

16. The non-transitory computer readable storage medium of claim 12, wherein:
the plurality of touch sensors comprise row sensors and column sensors, the row sensors orthogonal to the column sensors,
during a first time period, a plurality of row sensors are coupled, via the selected subset of sense channels, to the plurality of correlators to demodulate first data, and
during a second time period after the first time period, a plurality of column sensors are coupled, via the selected subset of sense channels, to the plurality of correlators to demodulate second data different from the first data.

17. An apparatus comprising:
a plurality of touch sensors;
a first multiplexer having one or more inputs, the inputs of the first multiplexer coupled to the plurality of touch sensors;
a plurality of sense channels configured to receive signals from an input device at the plurality of touch sensors via one or more outputs of the first multiplexer;

a plurality of digital signal processors coupled to outputs of the plurality of sense channels, wherein the plurality of digital signal processors includes a plurality of first demodulators configured to demodulate the received signals, wherein outputs of the plurality of digital signal processors are indicative of which locations on the apparatus the input device is touching;

a position estimation processor coupled to the outputs of the plurality of digital signal processors, the position estimation processor configured to estimate a location of the input device based on a first plurality of signals received from the plurality of sense channels selected by the first multiplexer and processed by the plurality of digital signal processors, the position estimation processor configured to select a subset of the plurality of sense channels coupled to one or more of the plurality of touch sensors proximate to the input device based on the estimated location of the input device; and a plurality of correlators couplable to the selected subset of the plurality of sense channels, wherein each of the plurality of correlators comprise a plurality of second demodulators, the second demodulators configured to demodulate a second plurality of received signals from the selected subset of the plurality of sense channels, the plurality of correlators configured to determine frequency content of the demodulated second plurality of received signals to obtain encoded data from the second plurality of received signals from the selected subset of the plurality of sense channels, wherein a number of the plurality of correlators is less than a number of sense channels included in the apparatus; and a plurality of second multiplexers, each second multiplexer having an output connected to one of the plurality of correlators and configured to couple one sense channel of the selected subset of sense channels to one of the plurality of correlators to simultaneously couple the selected subset of sense channels to the plurality of correlators.

18. The apparatus of claim 17, wherein a correlator of the plurality of correlators further comprises an adder coupled to a plurality of outputs of the second demodulators.

19. The apparatus of claim 17, wherein the first plurality of signals are received while two or more touch sensors of the plurality of touch sensors are coupled to each sense channel.

20. The apparatus of claim 17, wherein the second plurality of signals are received while one touch sensor of the plurality of touch sensors is coupled to each sense channel.

21. The apparatus of claim 17, further comprising:
a wireless transceiver configured to communicate with a wireless transceiver of the input device, wherein the frequency content of the demodulated signals comprises pairing information for establishing a connection between the wireless transceiver and the wireless transceiver of the input device.

22. The apparatus of claim 17, wherein:
the plurality of touch sensors comprise row sensors and column sensors, the row sensors orthogonal to the column sensors,
during a first time period, a plurality of row sensors are coupled, via the selected subset of sense channels, to the plurality of correlators to demodulate first data, and
during a second time period after the first time period, a plurality of column sensors are coupled, via the selected subset of sense channels, to the plurality of correlators to demodulate second data different from the first data.

* * * * *